(12) United States Patent
Kimura

(10) Patent No.: US 6,327,071 B1
(45) Date of Patent: Dec. 4, 2001

(54) DRIVE METHODS OF ARRAY-TYPE LIGHT MODULATION ELEMENT AND FLAT-PANEL DISPLAY

(75) Inventor: Koichi Kimura, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/421,316

(22) Filed: Oct. 18, 1999

(30) Foreign Application Priority Data

Oct. 16, 1998 (JP) .................................................. 10-295570

(51) Int. Cl.[7] .................................................. G02B 26/00
(52) U.S. Cl. .......................... 359/291; 359/290; 359/295; 359/224; 359/230
(58) Field of Search .................................... 359/290, 291, 359/295, 298, 254, 214, 224, 230, 293; 358/241, 59

(56) References Cited

U.S. PATENT DOCUMENTS

| | | | |
|---|---|---|---|
| 5,078,479 | * | 1/1992 | Vuilleumier .......................... 359/290 |
| 5,212,582 | * | 5/1993 | Nelson ................................. 359/224 |
| 5,629,794 | * | 5/1997 | Magel et al. ......................... 359/290 |
| 5,708,521 | * | 1/1998 | Jeon et al. ............................ 359/224 |
| 5,710,656 | * | 1/1998 | Goossen ............................... 359/291 |
| 5,745,281 | * | 4/1998 | Yi et al. ................................ 359/290 |

* cited by examiner

Primary Examiner—Loha Ben
(74) Attorney, Agent, or Firm—Sughrue, Mion, Zinn, Macpeak & Seas, PLLC

(57) ABSTRACT

In an array-type light modulation element drive method comprising the steps of arranging electromechanical light modulation elements for executing light modulation by displacement operation of a flexible section by an electrostatic force and elastic restoration operation of the flexible section like a two-dimensional matrix, selecting each pixel according to a scan electrode signal Vg, and giving a data signal Vb to a pixel electrode for driving the pixel, a basic frame is divided into an odd frame and an even frame and the polarity of an applied signal Vgs is inverted in the odd frame and the even frame for executing AC drive of the light modulation element.

12 Claims, 19 Drawing Sheets

UV LIGHT PATH

UV LIGHT PATH

CHARACTERISTICS OF APPLIED VOLTAGE
AND TRANSMISSION FACTOR

FIG. 4

【ODD FRAME】

| | | | SIGNAL ELECTRODE VOLTAGE (Vb) | |
|---|---|---|---|---|
| | | | ON Vb(on) | OFF Vb(off) |
| | | | 61 ━━━━ Vs(H)<br>------- Vth(L)<br>------- Vth(H)<br>------- Vs(L)<br>0 → | ------- Vs(H)<br>━━━ ---- Vth(L)<br>------- Vth(H)<br>------- Vs(L)<br>0 → |
| SCAN ELECTRODE VOLTAGE (Vg) | RESET Vg(r) | 63<br>━━━ --- Vs(H)<br>------- Vth(L)<br>------- Vth(H)<br>------- Vs(L)<br>0 → | Vgs(r-on)≦\|Vs(L)\|<br>------- Vs(H)<br>------- Vth(L)<br>------- Vth(H)<br>65 ━━━ Vs(L)<br>0 → | Vgs(r-off)≦\|Vs(L)\|<br>------- Vs(H)<br>------- Vth(L)<br>------- Vth(H)<br>------- Vs(L)<br>━━━<br>0 → |
| | SELECTION Vg(s) | ------- Vs(H)<br>------- Vth(L)<br>------- Vth(H)<br>------- Vs(L)<br>━━━<br>0 → | Vgs(s-on)≧\|Vs(H)\|<br>━━━ --- Vs(H)<br>------- Vth(L)<br>------- Vth(H)<br>------- Vs(L)<br>0 → | Vgs(s-off)≦\|Vth(L)\|<br>------- Vs(H)<br>━━━ --- Vth(L)<br>------- Vth(H)<br>------- Vs(L)<br>0 → |
| | NON-SELECTION Vg(ns) | ------- Vs(H)<br>------- Vth(L)<br>━━━ -- Vth(H)<br>------- Vs(L)<br>0 → | Vgs(ns-on)≦\|Vth(L)\|<br>------- Vs(H)<br>━━━ --- Vth(L)<br>------- Vth(H)<br>------- Vs(L)<br>0 → | Vgs(ns-off)≧\|Vth(H)\|<br>------- Vs(H)<br>------- Vth(L)<br>━━━ ---- Vth(H)<br>------- Vs(L)<br>0 → |

FIG. 5

[ EVEN FRAME ]

| | | | SIGNAL ELECTRODE VOLTAGE ( Vb ) | |
|---|---|---|---|---|
| | | | ON Vb(on) ------- Vs(H) ------- Vth(L) ------- Vth(H) ------- Vs(L) 0 → | OFF Vb(off) ------- Vs(H) ------- Vth(L) ------- Vth(H) ------- Vs(L) 0 ← |
| SCAN ELECTRODE VOLTAGE (Vg) | RESET Vg(r) | ------- Vs(H) ------- Vth(L) ------- Vth(H) ------- Vs(L) 0 → | $Vgs(r\text{-}on) \leq \|Vs(L)\|$ 0 →→ -Vs(L) ------- -Vth(H) ------- -Vth(L) ------- -Vs(H) | $Vgs(r\text{-}off) \leq \|Vs(L)\|$ 0 → ------- -Vs(L) ------- -Vth(H) ------- -Vth(L) ------- -Vs(H) |
| | SELECTION Vg(s) | ------- Vs(H) ------- Vth(L) ------- Vth(H) ------- Vs(L) 0 → | $Vgs(s\text{-}on) \geq \|Vs(H)\|$ 0 → ------- -Vs(L) ------- -Vth(H) ------- -Vth(L) ------- -Vs(H) | $Vgs(s\text{-}off) \leq \|Vth(L)\|$ 0 → ------- -Vs(L) ------- -Vth(H) ------- -Vth(L) ------- -Vs(H) |
| | NON-SELECTION Vg(ns) | ------- Vs(H) ------- Vth(L) ------- Vth(H) ------- Vs(L) 0 → | $Vgs(ns\text{-}on) \leq \|Vth(L)\|$ 0 → ------- -Vs(L) ------- -Vth(H) ------- -Vth(L) ------- -Vs(H) | $Vgs(ns\text{-}off) \geq \|Vth(H)\|$ 0 → ------- -Vs(L) ------- -Vth(H) ------- -Vth(L) ------- -Vs(H) |

IF Vgs IS IN THIS RANGE, TWO STATES ARE OBTAINED BASED ON HISTORY OF Vgs

DRIVE METHODS OF ARRAY-TYPE LIGHT MODULATION ELEMENT AND FLAT-PANEL DISPLAY

BACKGROUND OF THE INVENTION

1. Field of the Invention

This invention relates to drive methods of an array-type light modulation element manufactured by micromachining for changing the transmission factor of light by the electro-mechanical operation and a flat-panel display using the array-type light modulation element and in particular to alternating current (AC) drive of the array-type light modulation element and the flat-panel display.

2. Description of the Related Art

An electromechanical light modulation element for executing light modulation by causing a flexible thin film manufactured by micromachining to perform the mechanical operation by an electrostatic force is known. For example, the light modulation element comprises a flexible thin film made up of a transparent electrode and a diaphragm placed on a fixed electrode on a light waveguide plate via a support.

In the light modulation element, a predetermined voltage is applied across both electrodes, thereby generating an electrostatic force between the electrodes for bending the flexible thin film toward the fixed electrode. The optical characteristic of the element itself changes accordingly and light passes through the light modulation element. On the other hand, the applied voltage is set to zero, whereby the flexible thin film is elastically restored and the light modulation element shields light. Light modulation is thus executed.

By the way, to deform or elastically restore the light modulation element by an electrostatic force, the relationship between applied voltage Vgs and displacement of the flexible thin film shows a hysteresis characteristic. Therefore, the relationship between the applied voltage Vgs and light transmission factor T also shows a hysteresis characteristic as shown in FIG. 30.

According to the hysteresis characteristic, when the light modulation element is in an OFF state (light shield), it holds the OFF state if Vgs is Vth(L) or less, and if Vgs becomes Vth(H) or more, the light modulation element holds an ON state. When Vgs is Vth(H) or more, the light modulation element remains in the ON state, and if Vgs becomes Vs(L) or less, the light modulation element becomes saturated to the OFF state. If the polarity of Vgs is negative, the characteristic symmetrical with respect to the vertical axis of the positive polarity results.

However, in the example in the related art, using the characteristic, the light modulation elements are placed in two dimensions and matrix drive is executed, whereby two-dimensional light modulation elements can be formed. As the matrix drive, simple matrix drive and active matrix drive are available and in either drive method, from the above-described modulation element, the matrix can be driven with one polarity of the voltage applied to the modulation element and a DC voltage component is applied to the modulation element.

However, in drive of applying the DC component, if the inside of the flexible thin film is formed of an insulator, there is a possibility that in the structure of electrode-insulator-electrode structure, a parasitic internal electric field, etc., may occur because of an insulation failure caused by migration of the insulator or occurrence/trap of spatial charges, causing the operation to become unstable. For liquid crystal, etc., an AC-drive system is adopted to avoid instability of drive of applying the DC component; particularly, to make the insulator of macromolecule, etc., the possibility that an unstable state will be entered is large.

SUMMARY OF THE INVENTION

To the end, in this invention, there is provided an array-type light modulation element drive method comprising the steps of arranging electromechanical light modulation elements for executing light modulation by displacement operation of a flexible section by an electrostatic force and elastic restoration operation of the flexible section like a two-dimensional matrix, selecting each pixel according to a scan electrode signal, and giving a data signal to a pixel electrode for driving the pixel, wherein an AC signal is applied to electrode of the light modulation element for executing AC drive of the light modulation element.

In the array-type light modulation element drive method, AC drive is adopted, whereby unstable operation caused by occurrence of an internal electric field or an insulation failure caused by migration of an insulator involved in drive with a DC component added can be eliminated.

In this invention, the AC drive of the light modulation element is provided by dividing a basic period of the scan drive signal into an odd frame and an even frame and the polarity of the drive signal is inverted in the odd and even frames.

In the array-type light modulation element drive method, for example, if the drive signal in the odd frame is of positive polarity and the drive signal in the even frame is of negative polarity, the applied voltage to a modulation element becomes AC drive in total of one frame period, and balance can be held.

In this invention, the AC drive of the light modulation element is AC drive in a simple matrix structure of pixels.

In the array-type light modulation element drive method, the light modulation elements in a simple matrix with n rows x m columns can be AC-driven.

In this invention, the AC drive of the light modulation element is AC drive in an active matrix structure of pixels.

In the array-type light modulation element drive method, the light modulation elements in an active matrix with n rows x m columns can be AC-driven.

In this invention, the active matrix structure is any of a mechanical conductive switch type active matrix structure, a mechanical switch type active matrix structure, or a semiconductor switch type active matrix structure.

In the array-type light modulation element drive method, an active matrix with n rows×m columns of mechanical conductive switch type, mechanical switch type, semiconductor switch type, etc., can be AC-driven.

In this invention, the AC drive of the simple matrix structure is to set voltage across electrodes in an even frame, Veven, to the difference between applied voltage maximum value max and voltage across electrodes in an odd frame, Vodd.

In the array-type light modulation element drive method, the polarity of the drive voltage in the even frame can be inverted with respect to the drive voltage in the odd frame in one period for executing AC drive.

According to this invention, there is provided a drive method of a flat-panel display comprising an array-type light modulation element, a surface light source placed facing the array-type light modulation element, and a phosphor disposed on the opposite side to the surface light source with the array-type light modulation element between, the method comprising the steps of driving the array-type light modulation element by a drive method as claimed in any one of claims 1 to 6 and causing the phosphor to emit light for producing display by light emitted from the array-type light modulation element.

In the flat-panel display drive method, the electromechanical array-type light modulation element is AC-driven and the phosphor is caused to emit light for producing display by light source light passing through the array-type light modulation element, so that it is made possible to drive the flat-panel display stably with high definition.

In this invention, the surface light source is a light source for emitting ultraviolet rays for exiting the phosphor.

In the flat-panel display drive method, ultraviolet rays emitted from the surface light source can be allowed to pass through the light modulation element or shielded by the light modulation element for exiting the phosphor to emit light.

BRIEF DESCRIPTION OF THE DRAWINGS

FIG. 4 is a schematic representation to show the relationship between voltage across electrodes and applied voltage in an odd frame of the light modulation element shown in FIGS. 1A and 1B;

FIG. 5 is a schematic representation to show the relationship between voltage across electrodes and applied voltage in an even frame of the light modulation element shown in FIGS. 1A and 1B;

DESCRIPTION OF THE PREFERRED EMBODIMENTS

Referring now to the accompanying drawings, there are shown preferred embodiments of the invention.

Figure 1A:
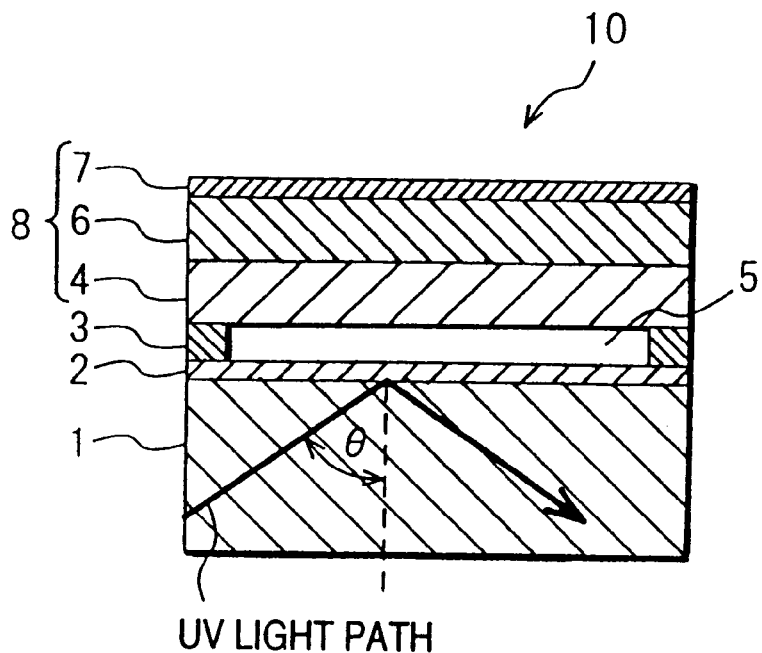
FIGS. 1A and 1B are drawings to show the configuration of a light modulation element according to a first embodiment of the invention.
Figure 1B:
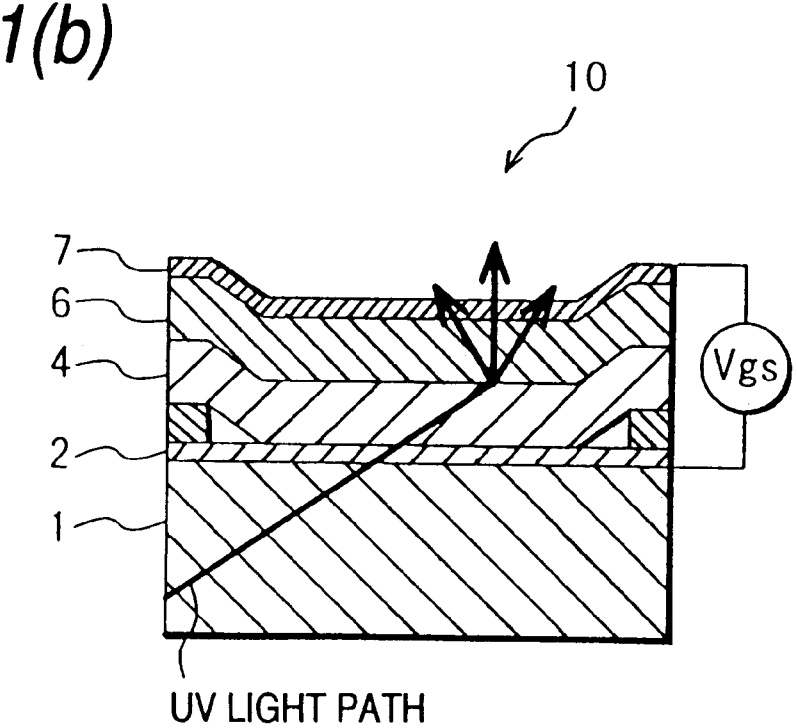
Figure 2:
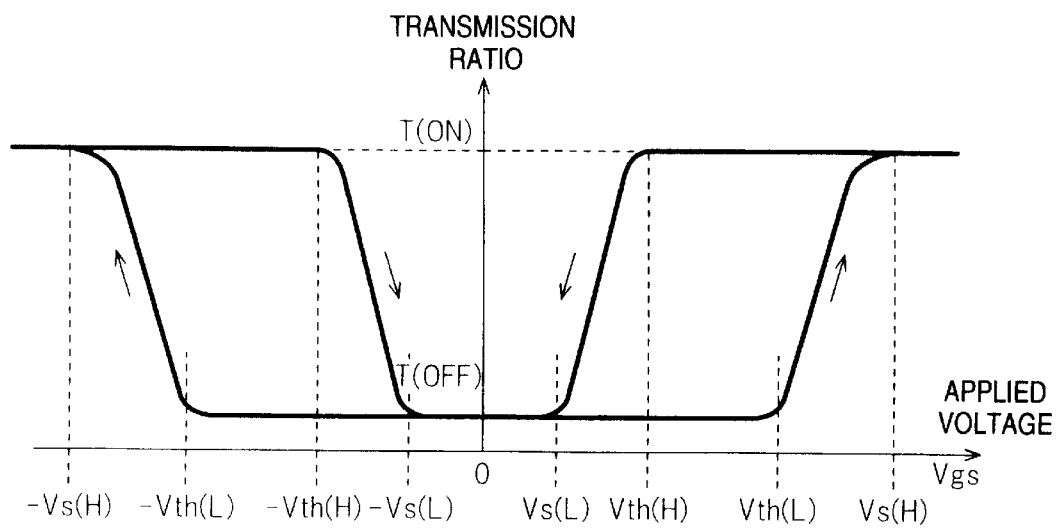
FIG. 2 is a drawing to show the characteristics of applied voltage and light transmission factor of the light modulation element shown in FIGS. 1A and 1B.
Figure 3:
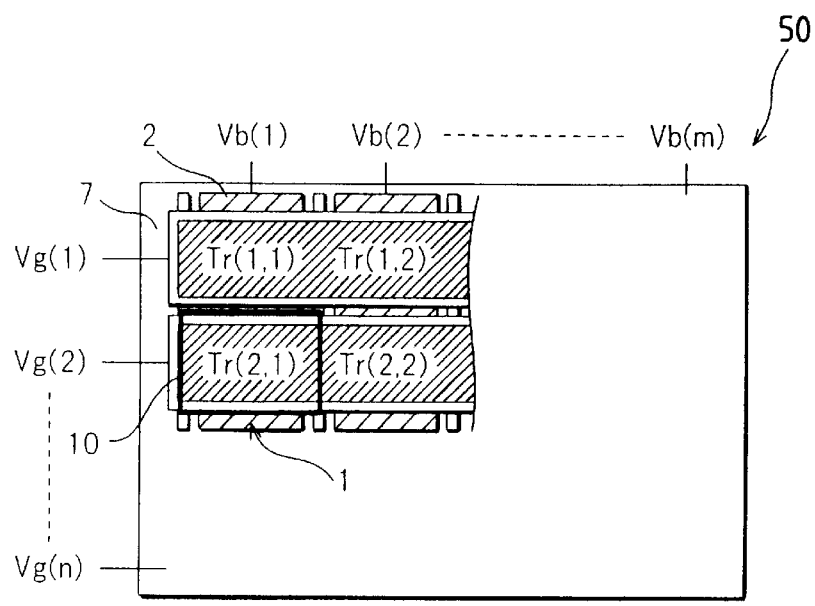
FIG. 3 is a plan view of an array-type light modulation element provided by arranging the light modulation elements shown in FIGS. 1A and 1B in two dimensions.

FIGS. 1A and 1B are drawings to show the configuration of a light modulation element according to a first embodiment of the invention. FIG. 2 is a drawing to show the characteristics of applied voltage and light transmission factor of the light modulation element shown in FIGS. 1A and 1B. FIG. 3 is a plan view of an array-type light modulation element provided by arranging the light modulation elements shown in FIGS. 1A and 1B in two dimensions.

As the operation principle of electromechanically operating a flexible thin film for executing light modulation, the light guide dispersion effect produced by bringing the flexible thin film and a transparent signal electrode out of or into contact with each other, which will be hereinafter referred to as light guide dispersion, can be used. In the light guide dispersion, a cavity is used as light transmission resistance and when a cavity is formed, emitted light from the signal electrode is shut off or is attenuated; only when the flexible thin film is brought into contact with the signal electrode, emitted light from the signal electrode is guided into the flexible thin film (mode coupling) and the light is dispersed through the flexible thin film, whereby the strength of the emitted light from the signal electrode is controlled (light modulation is executed).

As shown in FIGS. 1A and 1B, one electrode (signal electrode) 2 transparent for ultraviolet rays is formed on a light guide plate 1. Preferred as an example of the material of the electrode is a metal oxide such as ITO in high electron density, very thin metal film (aluminum, etc.,), a thin film comprising metal fine particles dispersed on a transparent insulator, a wide hand gap semiconductor doped in a high concentration, or the like.

An insulation support 3 is formed on the electrode 2. For example, a silicon oxide, silicon nitride, ceramic, resin, etc., can be used as the support 3. A diaphragm 4 is formed on the upper end face of the support 3. A cavity 5 is formed between the electrode 2 and the diaphragm 4. A semiconductor of polysilicon, etc., an insulation silicon oxide, ceramic, resin, etc., can be used as the diaphragm 4. Preferably, the diaphragm 4 has a refractive index equal to or higher than that of the light guide plate 1.

Formed on the diaphragm 4 is a light dispersion layer 8, for example, comprising asperities formed on the surface of an inorganic or organic transparent material, a microprism or microlens formed, an inorganic or organic porous material or fine particles different in refractive index dispersed in a transparent substrate.

An opposite electrode (scan electrode) 7 transparent for ultraviolet rays is formed on the light dispersion layer 6. For example, a similar material to that of the electrode 2 can be used for the electrode 7. The diaphragm 4, the light dispersion layer 6, and the electrode 7 make up a flexible thin film 8 as a flexible part.

The cavity 5 exists between the light guide plate 1 and the diaphragm 4; it is determined roughly by the height of the support 3. Preferably, the height of the gap 5 is about 0.1 $\mu$m to 10 $\mu$m, for example. The cavity 5 normally is formed by etching a sacrificial layer.

In addition to the configuration example, the diaphragm 4 and the light dispersion layer 8 may be formed of the same material. For example, the diaphragm 4 is made of a silicon nitride film and asperities are formed on the surface on the upper face side, whereby a dispersion function can be provided.

Next, the operation principle of the described light modulation element 10 will be discussed.

When voltage is off, if the voltages across the electrodes 2 and 7 is zero and the cavity 5 (for example, air) exists between the diaphragm 4 and the light guide plate 1, total reflection critical angle $\theta c$ on the interface with air is $\theta c = \sin^{-1}(nw)$ where the refractive index of the light guide plate 1 is nw.
Therefore, when the incidence angle on the interface, $\theta$, is $>\theta c$, ultraviolet light advances in the light guide plate 1 while it is totally reflected as shown in FIG. 1A.

When voltage is on, if voltage is applied across the electrodes 2 and 7 and the diaphragm 4 and the surface of the light guide plate 1 are brought into contact with each other or are made sufficiently close to each other, ultraviolet light propagates to and passes through the diaphragm 4 and further is dispersed through the light dispersion layer 6 and is emitted to the surface.

The light modulation element 10 according to the embodiment can execute light modulation by controlling the position of the diaphragm 4 as voltage is applied.

The transparent electrode 2 transparent for ultraviolet rays exists between the light guide plate 1 and the diaphragm 4, but the above-mentioned operation problem does not arise if the thickness is about the thickness of a normally used thin film (about 2000 Å).

To deform or elastically restore the flexible thin film 8 by an electrostatic force, the relationship between applied voltage Vgs and displacement of the flexible thin film shows a hysteresis characteristic. Therefore, the relationship between the applied voltage Vgs and light transmission factor T also shows a hysteresis characteristic as shown in FIG. 2.

For the hysteresis characteristic, when the modulation element (light modulation element) is in an OFF state (light shield), it holds the OFF state if Vgs is 0 V to Vth(L). If Vgs becomes Vs(H) or more, the modulation element is saturated to an ON state. Then, when Vgs is Vth(H) or more, the modulation element holds the ON state. Further, if Vgs becomes 0 V to Vs(L), the modulation element becomes saturated to the OFF state.

The hysteresis characteristic becomes a characteristic symmetrical with respect to the vertical axis for the polarity of Vgs. If the polarity of Vgs is negative, the left hysteresis loop in FIG. 2 is applied; if the polarity of Vgs is positive, the right hysteresis loop in FIG. 2 is applied. Thus, the left hysteresis loop is used as the hysteresis characteristic for an even frame and the right hysteresis loop is used as the hysteresis characteristic for an odd frame. The opposite may be adopted, namely, the right hysteresis loop is used as the hysteresis characteristic for an even frame and the left hysteresis loop is used as the hysteresis characteristic for an odd frame.

In addition to the light modulation part using the light guide plate described in detail, if light modulation is executed by deforming or moving a thin film by an electrostatic force as described later, a similar hysteresis characteristic is provided, and the positive and negative polarities can be related to even and odd frames for use in a similar manner.

In the embodiment, as shown in FIG. 3, the light modulation elements 10 are arranged like a two-dimensional matrix of n rows×m columns. That is, the light modulation elements 10 are placed at intersection points of Tr (1, 1), Tr (1, 2), Tr (2, 1), and Tr (2, 2) in the matrix, making up a part of an array-type light modulation elements 10.

The light modulation elements 10 are provided in a one-to-one correspondence with one-pixel areas. Here, in the description, attention is focused on the matrix with two rows and two columns in FIG. 3, a part of the matrix.

The array-type light modulation element 50 is operated by simple matrix drive.

The electrodes of the light modulation elements 10 arranged on the same row are connected in common as a scan electrode 7. Potential Vg is applied to the scan electrode. The electrodes of the light modulation elements 10 arranged on the same column are connected in common as a signal electrode 2. Potential Vb is applied to the signal electrode. Therefore, interelectrode voltage applied to each light modulation element 10, Vgs, becomes Vb−Vg.

To drive the array-type light modulation element 50, the scan electrodes 7 are scanned in the row order according to a scan signal and in synchronization with this, a data signal corresponding to the scanned scan electrode 7 is applied to the signal electrode 2.

Three types of signals (voltages), namely, a reset signal, a selection signal, and a nonselection signal are given to the scan electrode 7.

The reset signal turns off the light modulation elements 10 on the row (shields light) regardless of the previous state of the light modulation elements 10 or the signal electrode voltage. The scan electrode voltage at this time is Vg(r).

The selection signal is a signal for writing data into the row (write operation signal). The state of the light modulation element 10 is determined to be on (light passing through) or off (light shield) in accordance with the voltage applied to the signal electrode at the same time as the selection signal. The scan electrode voltage at this time is Vg(s).

The nonselection signal is a signal applied when no selection is made. At this time, the state of the light modulation elements 10 does not change and the previous state is held regardless of the signal electrode voltage. The scan electrode voltage at this time is Vg(ns).

On the other hand, two types of signals (voltages), namely, an ON signal and an OFF signal are given to the signal electrode 2.

The ON signal turns on the state of the light modulation elements 10 on the selected row (allows light to passes through). The signal electrode 2 voltage at this time is Vb(on).

The OFF signal turns off the state of the light modulation elements 10 on the selected row (shields light). In fact, however, it is assumed that the light modulation elements 10 are reset just before, thus to turn off the state of the light modulation elements 10, the signal may be a signal for holding the previous state (off state). The signal electrode 2 voltage at this time is Vb(off).

The voltage across the electrodes of the light modulation element, Vgs, is classified into the six types of voltages listed below according to the combinations of the scan electrode voltages and the signal electrode voltages. A specific condition is given according to the hysteresis characteristic of the voltages across the electrodes, Vgs, and the transmission factor.

$Vgs(r\text{-on})=Vb(\text{on})-Vg(r) \leq Vs(L)$ $Vgs(r\text{-off})=Vb(\text{off})-Vg(r) \leq Vs(L)$ $Vgs(s\text{-on})=Vb(\text{on})-Vg(s) \geq Vs(H)$ $Vgs(r\text{-off})=Vb(\text{off})-Vg(s) \leq Vth(L)$ $Vgs(ns\text{-on})=Vb(\text{on})-Vg(ns) \leq Vth(L)$ $Vgs(ns\text{-off})=Vb(\text{off})-Vg(ns) \geq Vth(H)$ The conditions are summarized as shown in a drawing corresponding to an odd frame (FIG. 4). For example, if the scan electrode voltage Vg is reset Vg(r) and the signal electrode voltage Vb is on, namely, Vb(on), the scan electrode voltage Vg of a value between Vs(H) and Vth(L) (heavy solid line 63 in the figure) is subtracted from the signal electrode voltage Vb of a value greater than Vs(H) (heavy solid line 61 in the figure), and the value (heavy solid line 65 in the figure) becomes smaller than Vs(L). That is, $Vgs(r\text{-on}) \leq Vs(L)$ Likewise, six types of voltages are determined.

To convert the voltage across the electrodes, Vgs, of the modulation element into AC every basic period (frame), FIG. S shows the case of an even frame of inversion polarity and FIG. 4 shows the case of an odd frame.

For the even frame, to invert the polarity of the applied voltage across the electrodes, Vgs, applied voltage Vodd based on Vg and Vb in the odd frame is set with respect to applied voltage Veven based on Vg and Vb in the even frame so as to satisfy the following:

$V\text{even}=V\text{max}-V\text{odd}$ where Vmax is the maximum value of the applied voltage.

Next, a method of using the relationship between the voltage across the electrodes, Vgs, and the transmission factor to write data into a matrix comprising the light modulation elements 10 placed in two dimensions will be discussed.

The matrix with two rows and two columns shown in FIG. 3 is used as the matrix and data is written. Assume that the following on data and off data are written into the light modulation elements 10 in the matrix:

| | |
|---|---|
| Tr(1, 1) -> on | Tr(1, 2) -> off |
| Tr(2, 1) -> off | Tr(2, 2) -> on |

Figure 6:
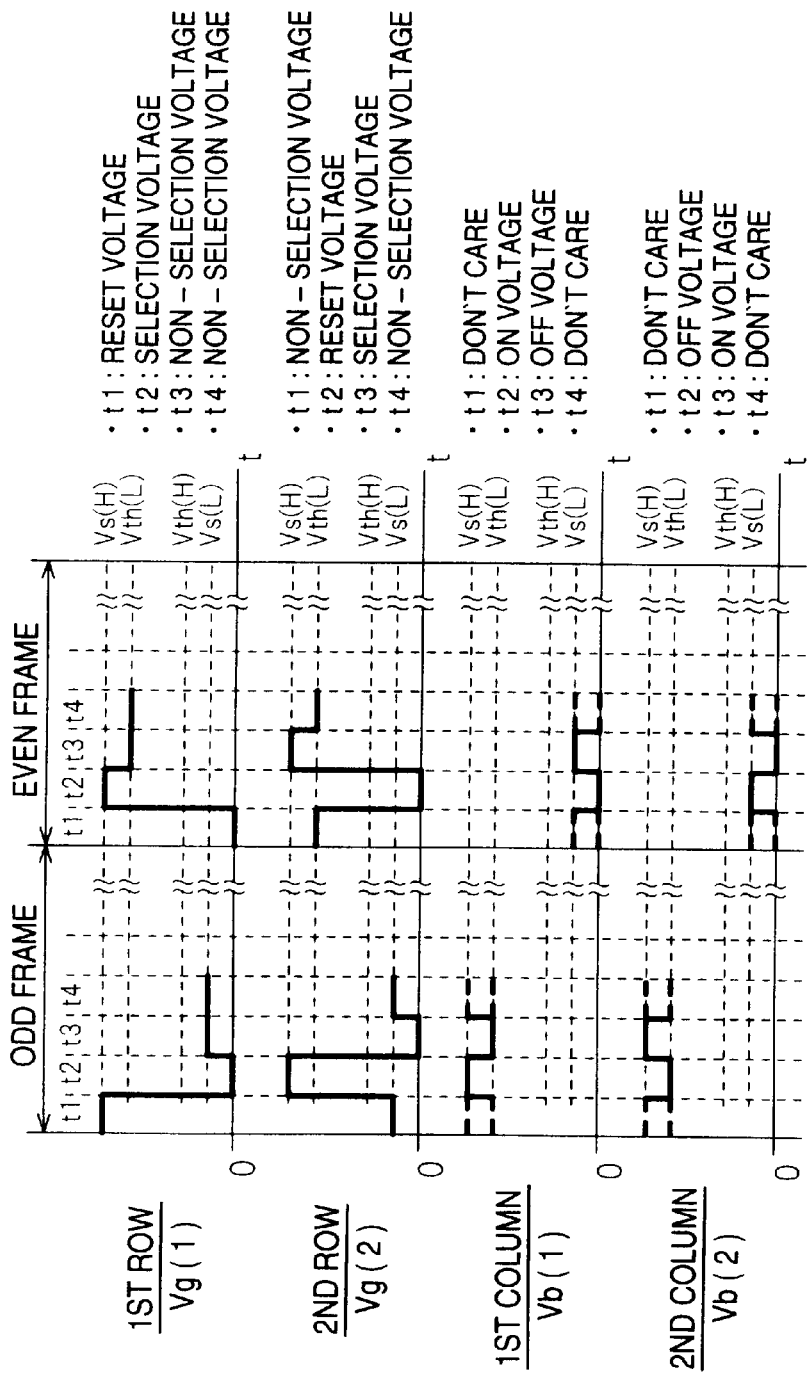
FIG. 6 is a drawing to show voltages Vg and Vb of AC drive of the simple matrix shown in FIG. 3.

The voltages of the waveforms as shown in FIG. 6 are applied to the matrix.

For example,

| | |
|---|---|
| t1: Reset voltage | t2: Selection voltage |
| t3: Nonselection voltage | t4: Nonselection voltage | are applied to the first row Vg(1) in the odd frame, even frame.

To the first column Vb(1),

| | |
|---|---|
| t: Don't care | t2: On voltage |
| t3: Off voltage | t4: Don't care |

Figure 7:
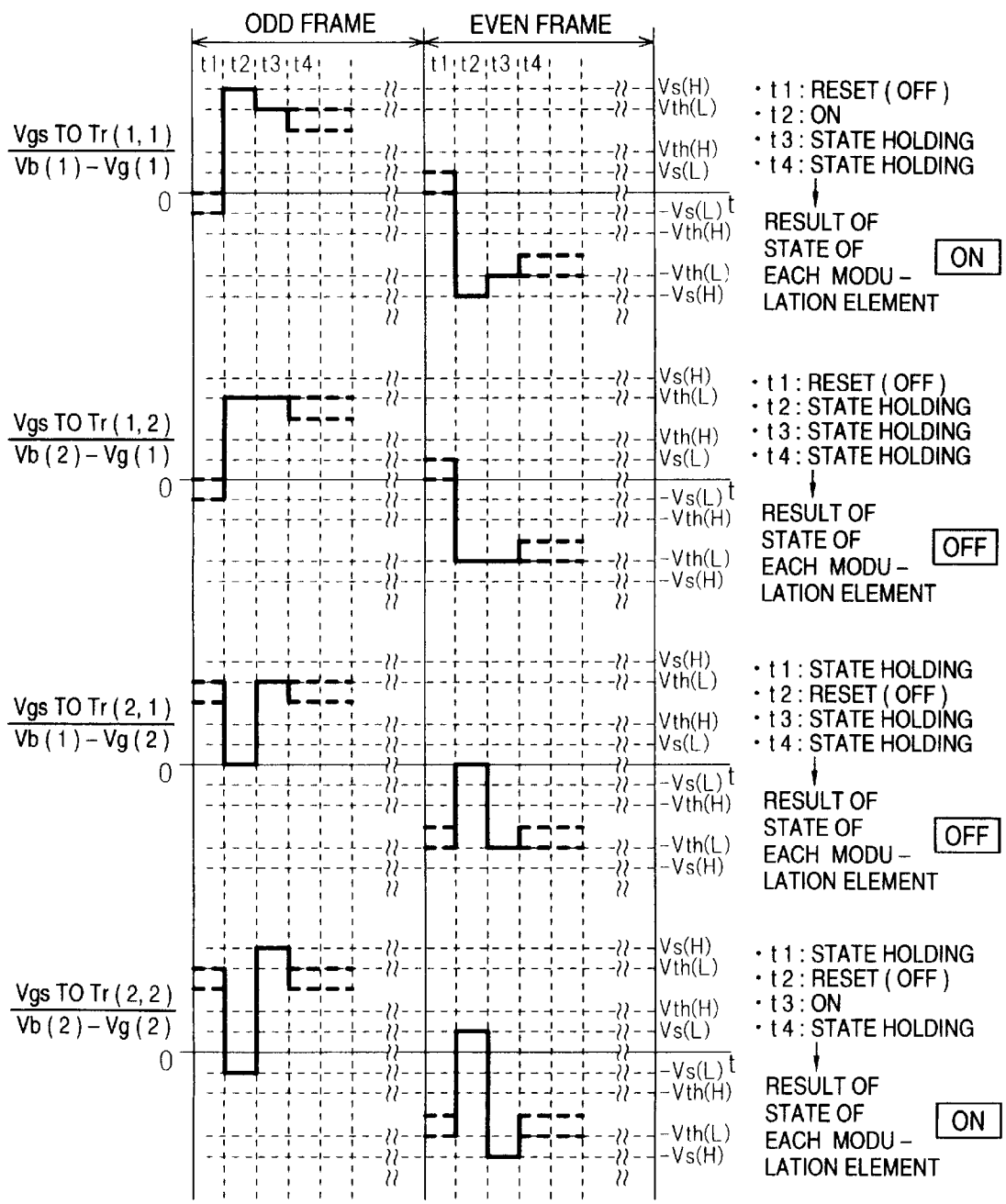
FIG. 7 is a drawing to show voltage Vgs applied to light modulation elements by AC drive of the simple matrix shown in FIG. 6.

Resultantly, the desired data is written into the light modulation elements in the row order as shown in FIG. 7.

After reset scan of each light modulation element, write scan for selecting the displacement operation or state holding of the element is executed, whereby the state before the write scan is prevented from affecting the next operation because of the hysteresis characteristic of the element, and stable write scan can be executed. It is made possible to drive the two-dimensional light modulation array of the simple matrix structure without contradiction, namely, so as to reliably hold the on/off state of each pixel on the nonselection scan line set at the write scan time because of the hysteresis characteristic of the element.

For example, in the matrix element Tr(1, 1) (first row, first column) described above, Vgs=Vb(1)–Vg(1), thus in the odd frame, even frame,

| | |
|---|---|
| t1: Reset voltage (off) | t2: On |
| t3: Stateholding | t4: Stateholding |

Therefore, the on state at t2 is held (memorized) and resultantly the light modulation element 10 of the matrix element Tr(1, 1) is turned on. Likewise, the light modulation elements 10 of the matrix elements Tr(1, 2), Tr(2, 1), and Tr(2, 2) are turned off, off and on respectively.

According to the operation, based on the Vg and Vb applied voltages in the odd frame and the even frame shown in FIG. 6, the applied voltage to the modulation element, Vgs, is converted into AC centering around 0 V in the odd frame and the even frame every frame (basic period) as shown in FIG. 7, the DC component is eliminated, AC drive of the simple matrix is executed, the reliable operation is enabled, and the array-type light modulation element can be upsized and be put into high definition.

Next, a second embodiment of the invention will be discussed in detail with reference to the accompanying drawings.

In the embodiment, AC drive is introduced into an active matrix structure.

First, active driving an array-type light modulation element with semiconductor switches will be discussed.

Figure 8:
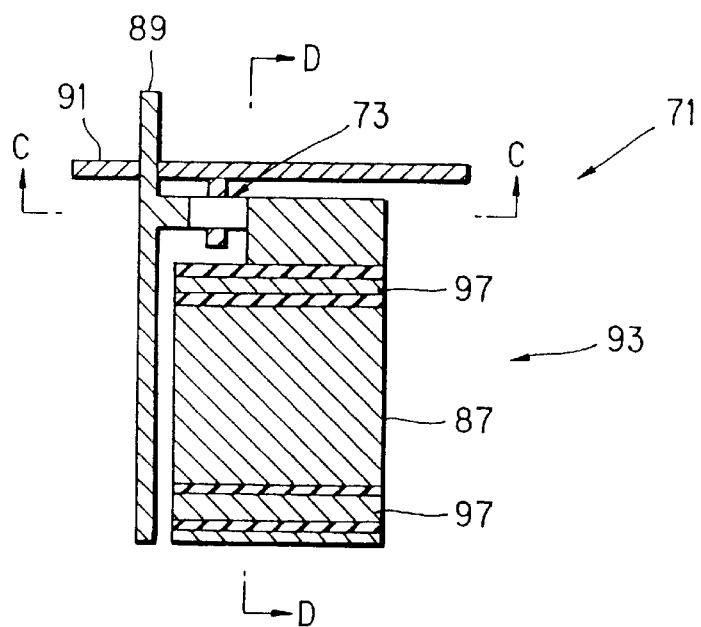
FIG. 8 is a plan view of a light modulation part according to a second embodiment of the invention.
Figure 9A:
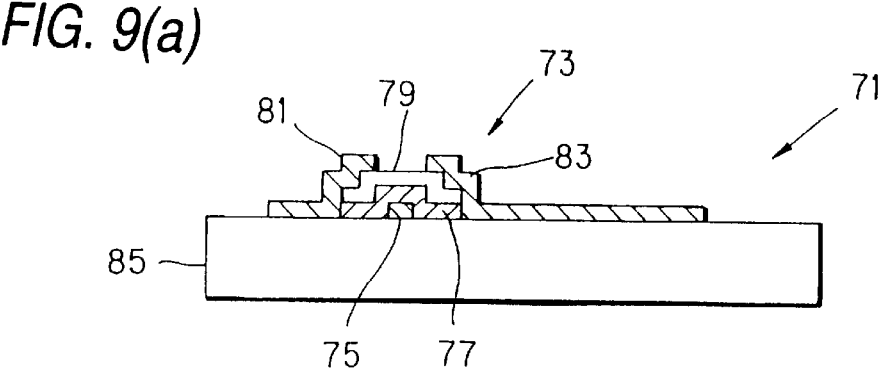
FIGS. 9A and 9B are sectional views taken on lines C—C and lines D—D in FIG. 8.
Figure 9B:
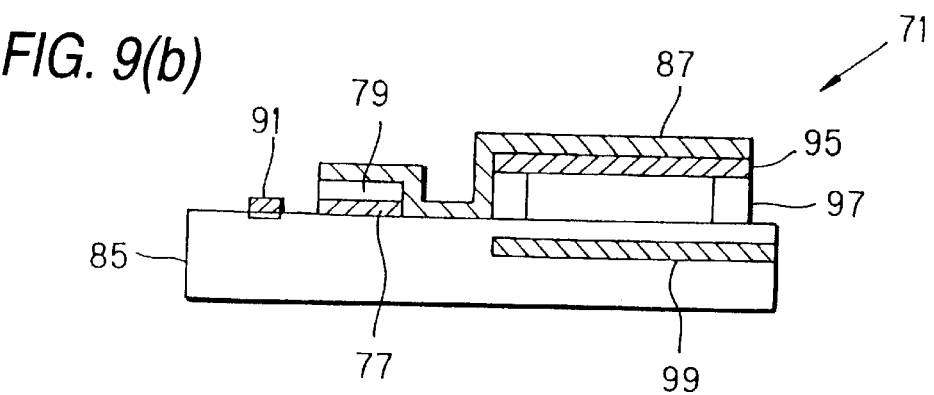
Figure 10:
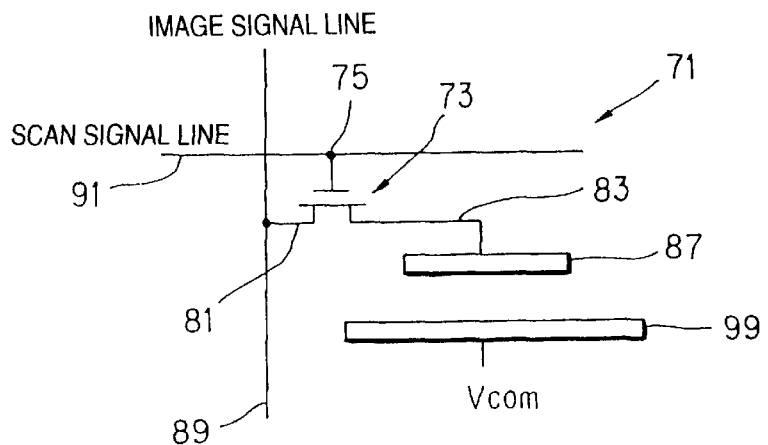
FIG. 10 is an equivalent circuit diagram of the pixel part shown in FIG. 8.

FIG. 8 is a plan view of a light modulation part of the embodiment. FIGS. 9A and 9B are sectional views taken on lines C—C and lines D—D in FIG. 8. FIG. 10 is an equivalent circuit diagram of the pixel part shown in FIG. 8.

As shown in FIGS. 8 to 10, an array-type light modulation element 71 comprises an active element (for example, TFT) 73 for each pixel. The TFT 73 is made up of a gate electrode 75, an insulating film 77, an a-Si:H layer 79, a drain electrode 81, and a source electrode 83, as shown in FIGS. 9A and 10. The TFT 73 is formed on a substrate 85.

A pixel electrode 87 is connected to the source electrode 83 of the TFT 73, as shown in FIGS. 9B and 10. An image signal line 89 for each column is connected to the drain electrode 81. A scan signal line 91 for each row is connected to the gate electrode 75.

The pixel electrode 87 is deposited on the top of a flexible thin film 95 in a light modulation part 93. The flexible thin film 95 is placed on supports 97. The substrate 85 is provided with a common electrode 99 opposed to the pixel electrode 87, and potential Vcom is applied to the common electrode.

The operation of the described array-type light modulation element 71 is as follows:

FIG. 10 is an equivalent circuit diagram of the pixel part with a semiconductor transistor. In the light modulation part 93, voltage Vg–on for bringing the TFT 73 into conduction is applied to the scan signal line 91 connected to the gate electrode 75. When desired image signal voltage Vb is applied to the image signal line 89 connected to the drain electrode 81, the drain electrode 81 and the source electrode 83 conduct. Therefore, the image signal voltage is applied to the pixel electrode 87, whereby an electrostatic force acts because of voltage between the potential Vcom of the common electrode 99 and the potential of the pixel electrode 87, Vgs=(Vb−Vcom), and desired light modulation is executed.

After this, if the TFT 73 is brought out of conduction for scanning another row, the above-described light modulation state is held and matrix modulation of more than one row is enabled.

In an example of an active matrix with n rows×m columns, scan voltage is applied to the scan signal lines 91 in sequence and the TFTs connected to the scan signal lines 91 are turned on in union. At the same time, image signal voltage Vb is applied from the image signal line 89 and charges are accumulated in the capacitance of each pixel through the TFT 73. Upon completion of scanning one row, the TFT 73 is turned off and the charges accumulated in the pixel capacitance are held intact.

Next, an example of forming the active matrix device of the embodiment as a mechanical conductive switch type is shown.

Figure 11:
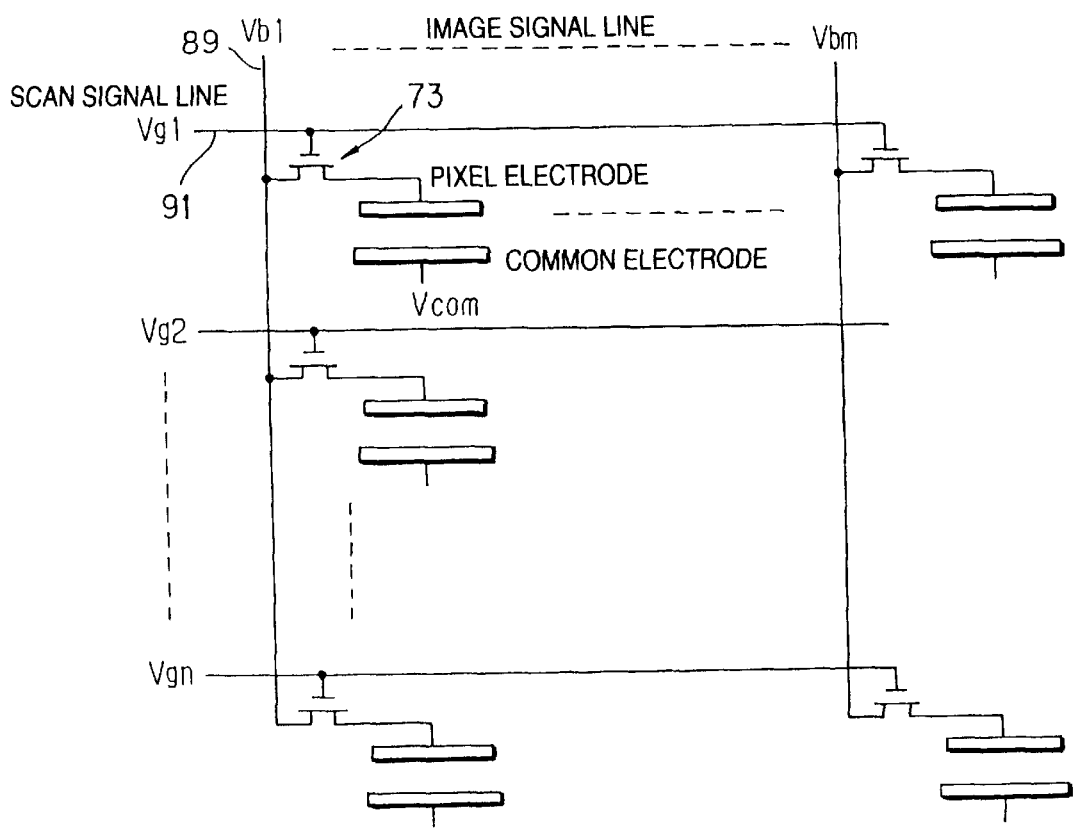
FIG. 11 is an equivalent circuit diagram of an active matrix with semiconductor transistors in the pixel parts shown in FIG. 8.
Figure 12:
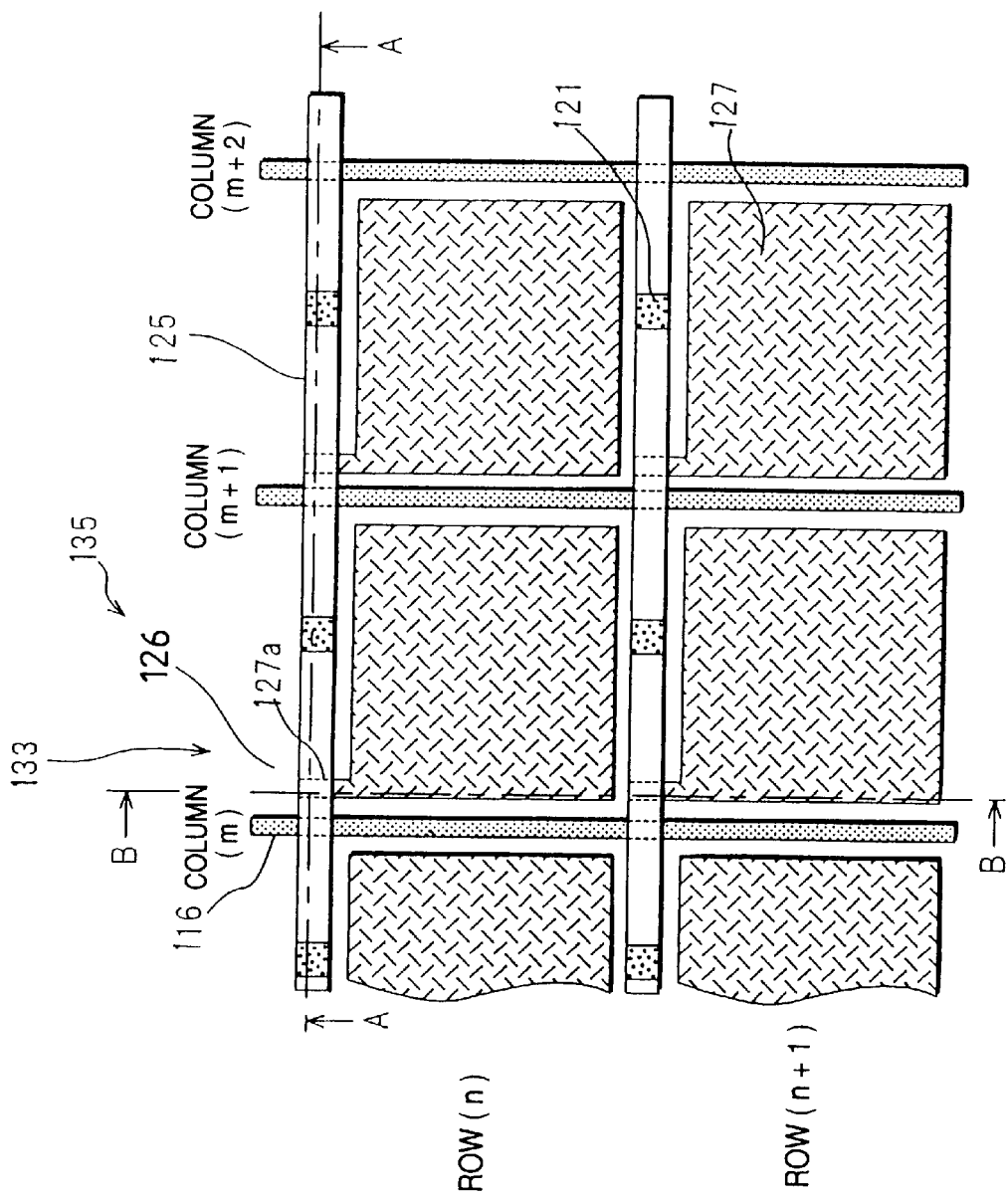
FIG. 12 is a plan view of an active matrix device comprising mechanical conductive switches in place of the semiconductor switches shown in FIG. 11.
Figure 13:
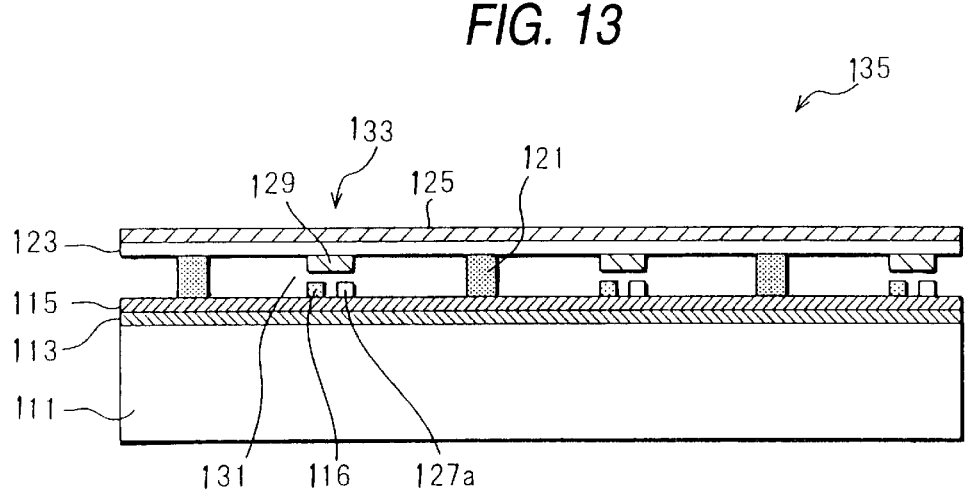
FIG. 13 is a sectional view taken on line A—A in FIG. 12.
Figure 14:
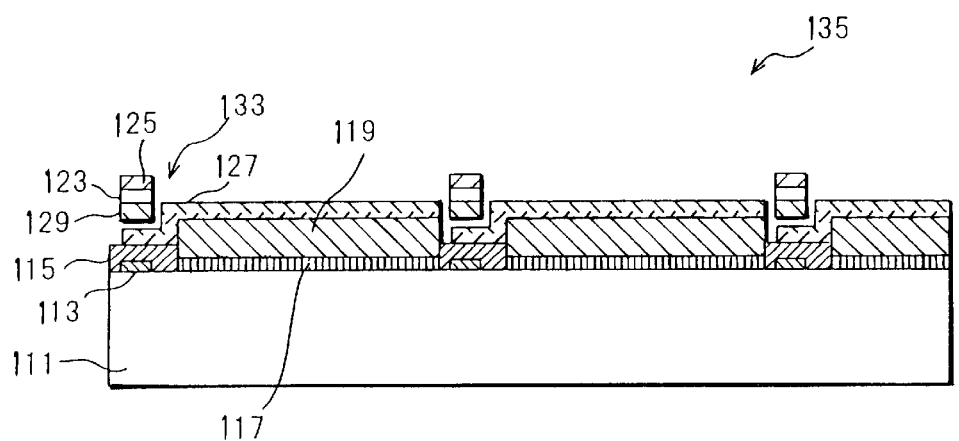
FIG. 14 is a sectional view taken on line B—B in FIG. 12.

FIG. 12 is a plan view of an active matrix device comprising mechanical conductive switches in place of the semiconductor switches shown in FIG. 11. FIG. 13 is a sectional view taken on line A—A in FIG. 12 and FIG. 14 is a sectional view taken on line B—B in FIG. 12.

A plurality of stripe-like parallel scan signal common electrodes 113 (first scan electrodes) are formed on a substrate 111. Insulating layers 115 for at least covering the scan signal common electrodes 113 are formed on the substrate 111. A plurality of stripe-like parallel data signal electrodes 116 orthogonal to the scan signal common electrodes 113 are formed on the substrate 111. A pixel part common electrode 117 and a light function element 119 are deposited in order in the quadrangular area surrounded by each scan signal common electrodes 113 and each data signal electrode 116 on the substrate 111.

On the insulating layer 115 formed lice a stripe along the scan signal common electrode 113, a plurality of supports 121 are placed with an equal spacing along the length direction of the insulating layer 115. A stripe-like flexible thin film 123 and a stripe-like scan signal electrode 125 (second scan electrode) are deposited and placed in order on the upper end parts of the supports 121. The flexible thin film 123 is made of an insulating material. The flexible thin film 123 and the scan signal electrode 125, which are placed on the supports 121, are opposed to the scan signal common electrode 113 coated with the insulating layer 115 with a gap between. The scan signal electrodes 125 and the data signal electrodes 116 are disposed like a matrix having a plurality of intersection parts 126 (see FIG. 12).

The supports 121 may be formed by another formation method of fixing the end parts of a hollow thin film, for example, without being provided separately as mentioned above.

A pixel electrode 127 is formed on the top of the light function element 119 for sandwiching the light function element 119 between the pixel electrode 127 and the pixel part common electrode 117. A part 127a of the pixel electrode 127 (see FIG. 12) is extended in the proximity of the data signal electrode 116 on the insulating layer 115. The data signal electrode 116 and the part 127a of the pixel electrode 127 are disposed at the same height with a spacing in parallel as shown in FIG. 13. This means that they are disposed in a non-conduction state.

The flexible thin film 123 is formed on the lower face with a conductive film 129 made of metal, etc. Aluminum, copper, silver, gold, etc., can be used for the conductive film 129. The conductive film 129 is opposed to the data signal electrode 116 and the pixel electrode 127 with a cavity 131 between. The flexible thin film 123, the data signal electrode 116, the pixel electrode 127, and the conductive film 129 make up a mechanical conductive switch 133 of matrix drive means. The mechanical conductive switch 133 is placed in each intersection part 126 of each of the data signal electrodes 116 and each of the scan signal electrodes 125 disposed like a matrix.

Figure 15A:
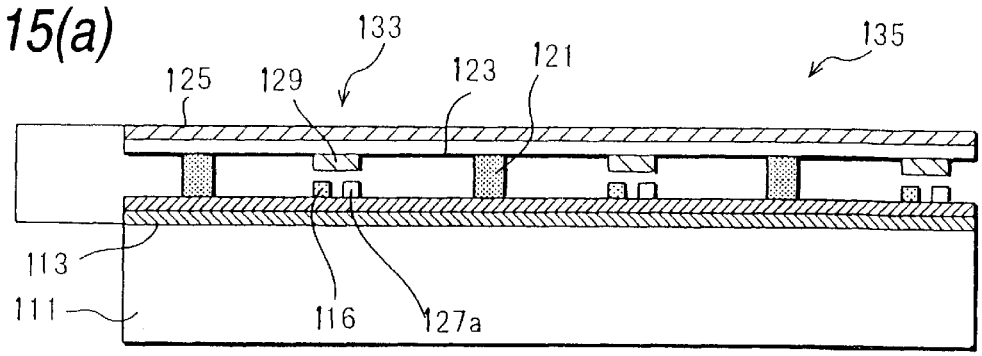
FIGS. 15A and 15B are schematic representations to show the operation state of the active matrix device shown in FIG. 12.
Figure 15B:
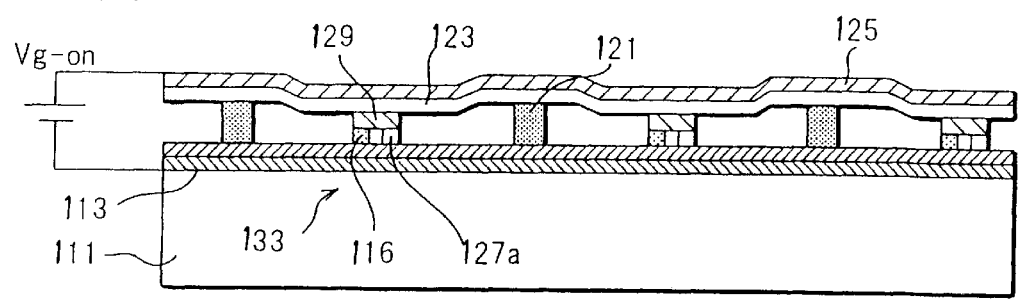

FIG. 15 is a schematic representation to show the operation state of the active matrix device shown in FIG. 12.

In the described active matrix device 135, if the scan signal electrode 125 is at the same potential as the scan signal common electrode 113, the flexible thin film 123 does not receive an electrostatic force and is not bent. Therefore, the data signal electrode 116 and the pixel electrode 127a do not come into electric contract with each other and are held in a non-conduction state, as shown in FIG. 15A.

On the other hand, if a voltage is applied to the scan signal electrode 125 relative to the scan signal common electrode 113, the flexible thin film 123 is bent to the substrate 111 side and by an electrostatic force and the conductive film 129 come in electric contact with the data signal electrode 116 and the pixel electrode 127a positioned below the flexible thin film 123, as shown in FIG. 15A, whereby the data signal electrode 116 and the pixel electrode 127a become equal in potential.

If the voltage of the scan signal electrode 125 is set to zero, the flexible thin film 123 is restored to the former position by an elastic force and moves away from the data signal electrode 116 and the pixel electrode 127a, whereby the state shown in FIG. 15A is entered and the data signal electrode 116 and the pixel electrode 127a are again brought out of conduction.

Figure 16:
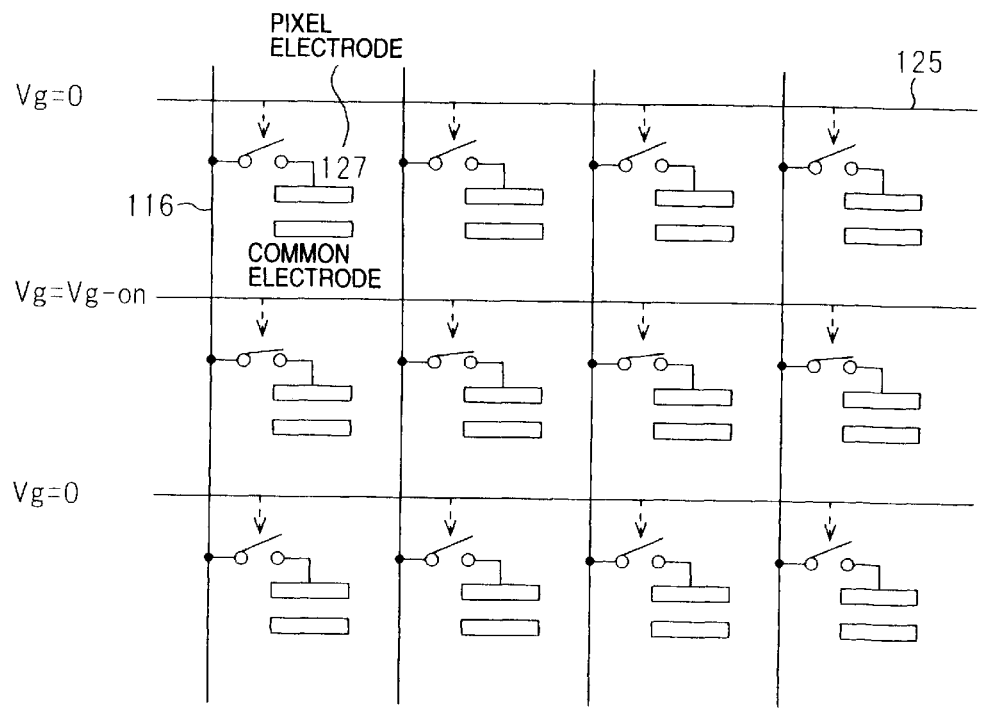
FIG. 16 is a schematic representation of the matrix operation of the active matrix shown in FIG. 12.

FIG. 16 is a schematic representation of the matrix operation of the active matrix device shown in FIG. 12.

In the matrix shown in FIG. 16, the pixel electrode 127 of the scan signal electrode 125 to which voltage Vg–on is applied for bending the flexible thin film 123 conducts with the data signal electrode 116, whereby the data signal electrode 116 and the pixel electrode 127 become equal in potential. The pixel electrodes of other scan signal electrodes are held at electrically independent potentials.

Figure 17:
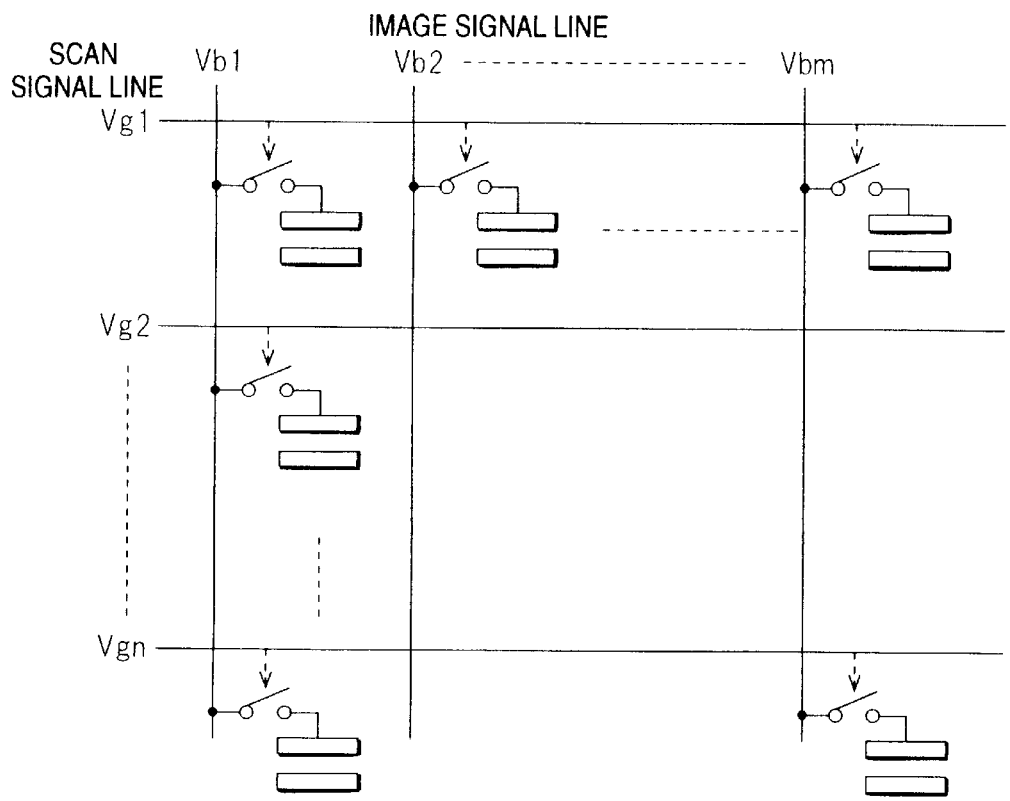
FIG. 17 is an equivalent circuit diagram of an active matrix device comprising mechanical switches in place of the semiconductor switches shown in FIG. 11.

FIG. 17 is an equivalent circuit diagram of the active matrix device comprising mechanical switches.

It also shows an example of the active matrix with n rows x m columns in the second embodiment comprising mechanical switches.

In operation, as in FIG. 16, a pixel signal Vb is applied across electrodes through a mechanical switch in synchronization with on/off of a scan signal Vg and the pixel is driven.

Figure 18:
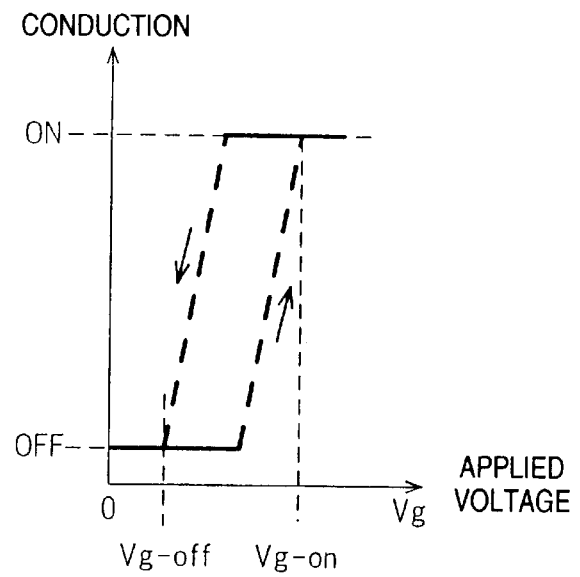
FIG. 18 is a hysteresis diagram to show the switch characteristic of a flexible thin film in the active matrix shown FIG. 12.

FIG. 18 is a hysteresis diagram to show the switch characteristic of the flexible thin film in the active matrix.

Assuming that the voltage of the scan signal electrode 125 relative to the scan signal common electrode 113 is Vg, the switch characteristic based on the flexible thin film 123 has a hysteresis characteristic as shown in FIG. 18. That is, when Vg becomes Vg–on or more, a conduction state is entered (on); when Vg becomes Vg–off or less, a non-conduction state is entered (off).

Next, the AC drive operation according to the above-described active matrix structure will be discussed.

Figure 19:
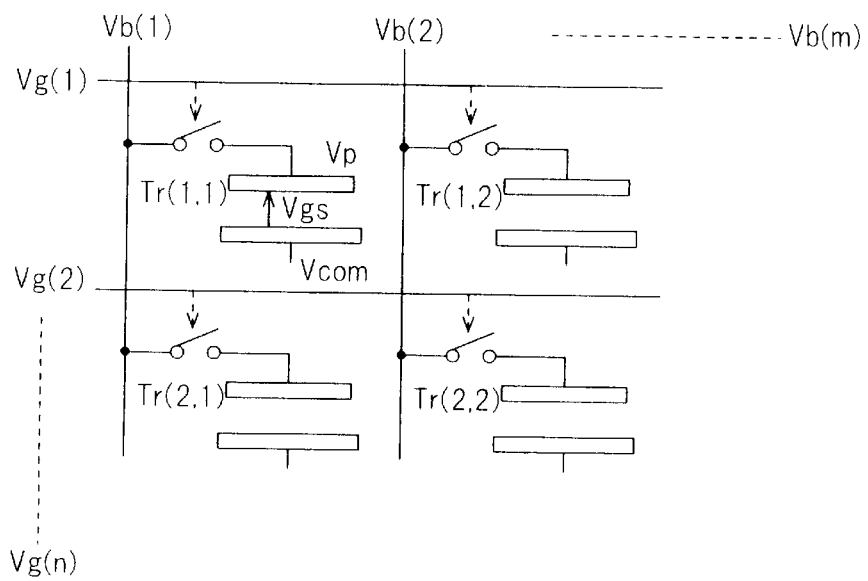
FIG. 19 is a drawing to show a structure example of an active matrix structure with n rows×m columns comprising semiconductor switches, mechanical switches, etc.

FIG. 19 is a drawing to show the active matrix structure with n rows×m columns comprising semiconductor switches, mechanical switches, etc.

In FIG. 19, letting the potential of each pixel electrode be Vp and the potential of the common electrode be Vcom, applied voltage to light modulation element, Vgs, becomes Vgs=Vp−Vcom.

Active matrix AC drive for writing the following binary data into the pixels (two rows, two columns) as in FIG. 19 will be discussed.

| Tr(1, 1) -> on | Tr(1, 2) -> off |
| Tr(2, 1) -> off | Tr(2, 2) -> on |

Figure 20:
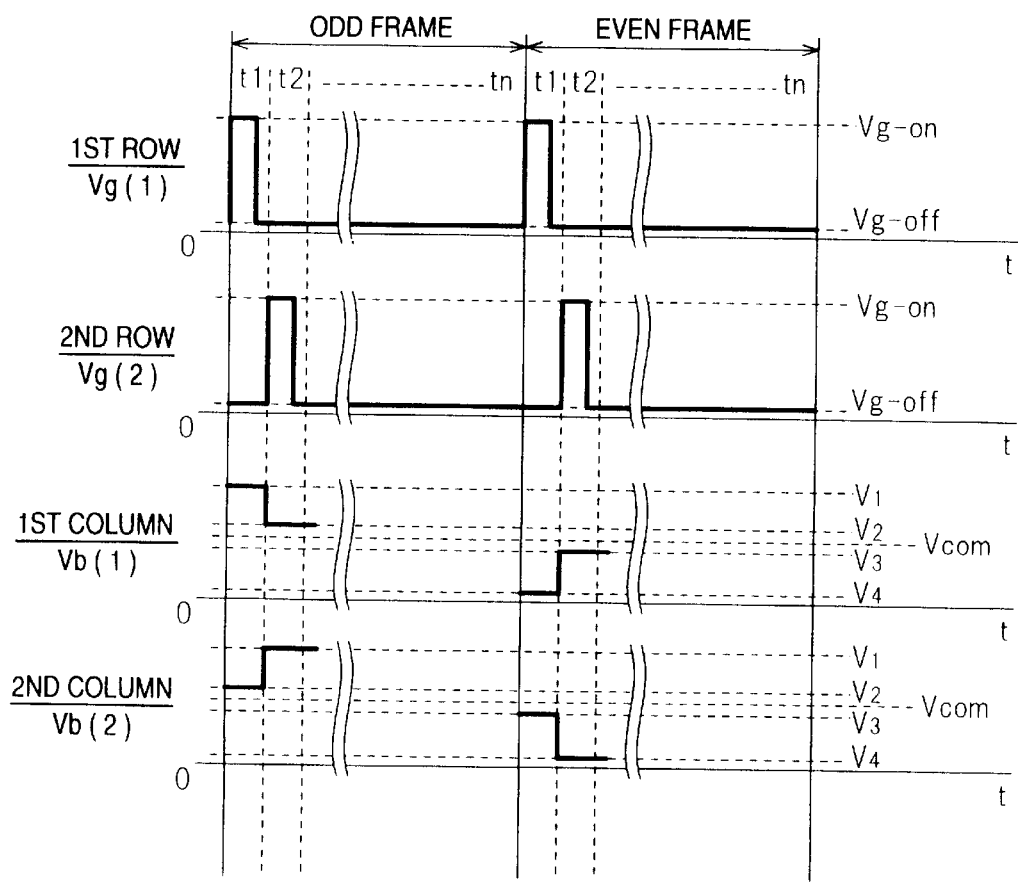
FIG. 20 is a drawing to show voltages Vg and Vb of AC drive of the active matrix shown in FIG. 19.

FIG. 20 is a drawing to show voltages Vg and Vb of AC drive of the active matrix shown in FIG. 19.

In this case, as shown in FIG. 20, the applied voltages are
first row Vg
  t1: Scan on (conduction)
  t2: Scan off (non-conduction)
second row Vg
  t1: Scan off (non-conduction)
  t2: Scan on (conduction)
first column Vb
  t1: On (pass through) voltage is applied to Tr (1, 1)
  t2: Off (shield) voltage is applied to Tr (2, 1)
second column Vb
  t1: Off (shield) voltage is applied to Tr (1, 2)
  t2: On (pass through) voltage is applied to Tr (2, 2)
on both odd and even frames.

Thus, the scan gate electrodes are turned on (brought into conduction) by applying Vg–on in the row order and in synchronization with this, on (pass through) or off (shield) potential is supplied from the data signal electrode. After this, if the scan gate electrode is turned off (brought out of conduction), the potential of the pixel electrode is held.

The voltages supplied from the scan gate electrode are only Vg–on and Vg–off;, as shown in FIG. 20, the voltages supplied from the data signal electrode (Vp or Vb) are

| in odd frame, | V1 (on) |
| | V2 (off) |
| in even frame, | V3 (on) |
| | V4 (off) | where
  V1=Vcom+Vs (H)
  V2=Vcom+Vs (L)
  V3=Vcom−Vs (L)
  V4=Vcom−Vs (H)

Figure 21:
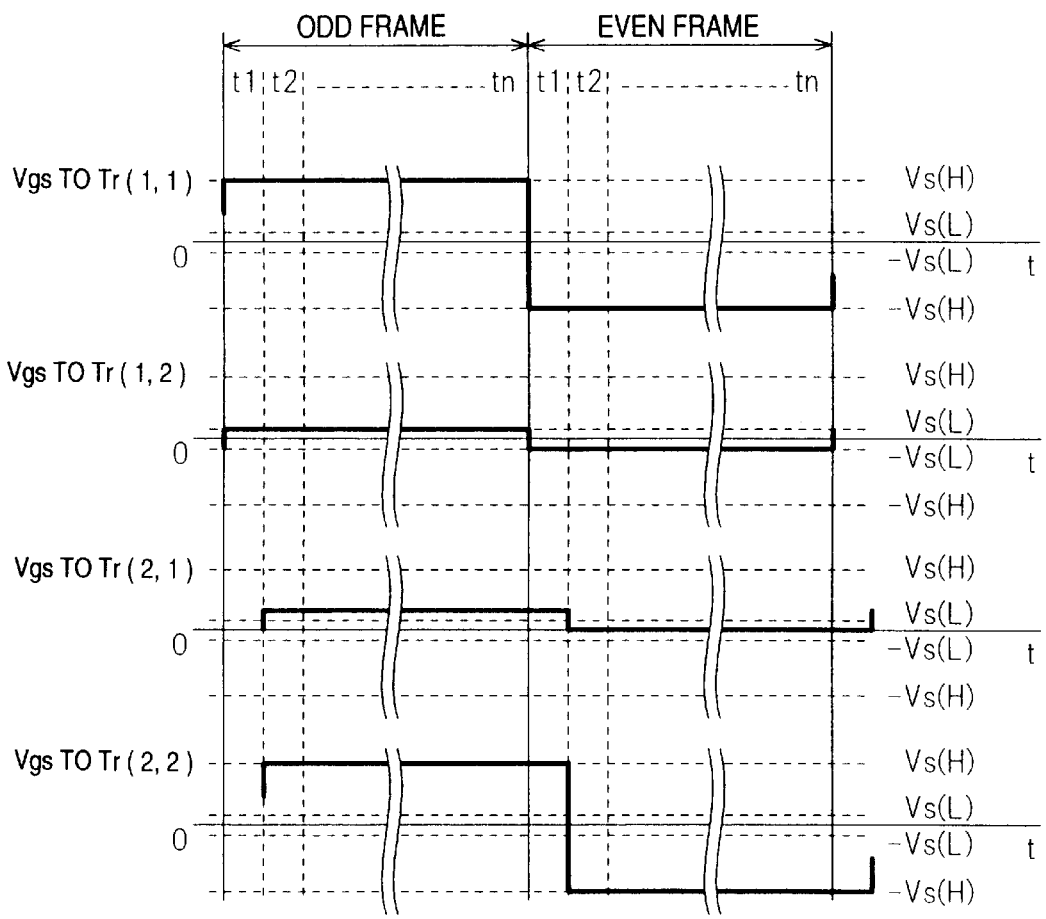
FIG. 21 is a drawing to show voltage applied to light modulation element, Vgs, by AC drive of the active matrix shown in FIG. 20.

FIG. 21 is a drawing to show the voltage applied to light modulation element, Vgs, by AC drive of the active matrix shown in FIG. 20.

For Vgs to each pixel based on voltage application previously shown in FIG. 20, as shown in FIG. 21, for example, Vgs to Tr(1, 1) in odd frame becomes Vgs=Vs (H) by assigning V1 to Vp from the expression of Vgs=Vp−Vcom.

Resultantly, t1: On and t2: State holding, resulting in on as the state of the pixel Tr(1, 1).

As the result in FIG. 21, Tr(1, 1) is turned on, Tr(1, 2) is turned off, Tr(2, 1) is turned off, and Tr(2, 2) is turned on.

Thus, the write operation intended in FIG. 19 is executed as intended.

As shown in FIG. 21, the applied voltage to each light modulation element, Vgs=Vp−Vcom, is converted into AC in odd and even frames and DC component becomes zero. Strictly, it is feared that a DC component may occur capacitance parasitic on the element or the like, but a correction can be made if the common electrode potential is adjusted.

The example of AC drive by polarity inversion every frame (basic period) has been described, but the scope of the invention is not limited to it. Any other similar method may be adopted if a similar effect can be produced.

In the example, the potential of the pixel common electrode Vcom is fixed, thus high potential is required for the data signal electrode voltage. However, the common electrode potential can also be changed at the polarity inversion time for converting Vgs into AC. According to this method, it is made possible to lower the data signal electrode voltage.

Further, if the polarity of Vgs becomes asymmetrical at polarity inversion time in odd frame even frame, flicker may occur if the display unit comprises two-dimensional light modulation elements. To overcome this problem, to decrease flicker, polarity inversion can also be executed while synchronizing with the scan period or frame period every row, column, or adjacent pixel. In any way, the drive voltage applied to each MEM light modulation element is converted into AC, whereby insulator migration or spatial charges are prevented from occurring, and stable drive can be executed.

The light modulation elements using the light guide dispersion effect shown in FIG. 1 are used in the description of the embodiment, but the drive method according to the invention is not limited to the light modulation elements and can also be applied to light modulation elements based on light guide reflection. The light modulation element comprises a reflection film of aluminum, etc., properly inclined on a diaphragm as a flexible thin film, wherein light guided into the flexible thin film at voltage on time is reflected on the reflection film toward the side of a light guide plate for emitting light. In addition, the invention can also be applied to the following light modulation element:

First, an example of using Fabry-Perot interference will be discussed as the operation principle of electromechanically operating a flexible thin film for executing light modulation. In the Fabry-Perot interference, in a state in which two planes are placed in parallel facing each other, an incidence light beam is repeatedly reflected and transmitted and are divided into a large number of light beams, which become parallel to each other. The transmitted light beams overlap each other and interfere with each other at infinite-point. Letting the angle which the plane forms with normal incidence light beam be i, the light path difference between the adjacent light beams is given as x=nt·cos i where n is the refractive index between the two planes and t is the interval therebetween. If the light path difference x is an integral multiple of wavelength λ, the transmitted light beams strengthen each other; if the light path difference x is odd times as large as one-half wavelength, the transmitted light beams cancel each other. That is, if phase change does not occur at the reflection time, the transmitted light reaches the maximum as 2$nt$·cos i=$m\lambda$ the transmitted light reaches the minimum as 2$nt$·cos i=(2$m$+1)$\lambda$/2 where m is a positive integer.

That is, the flexible thin film is moved so that the light path difference x becomes a predetermined value, whereby it is made possible to modulate light emitted from a transparent substrate and emit the light through the flexible thin film.

A specific configuration of using light modulation elements using such Fabry-Perot interference and a surface light source in combination to form a flat-panel display will be discussed.

Figure 22:
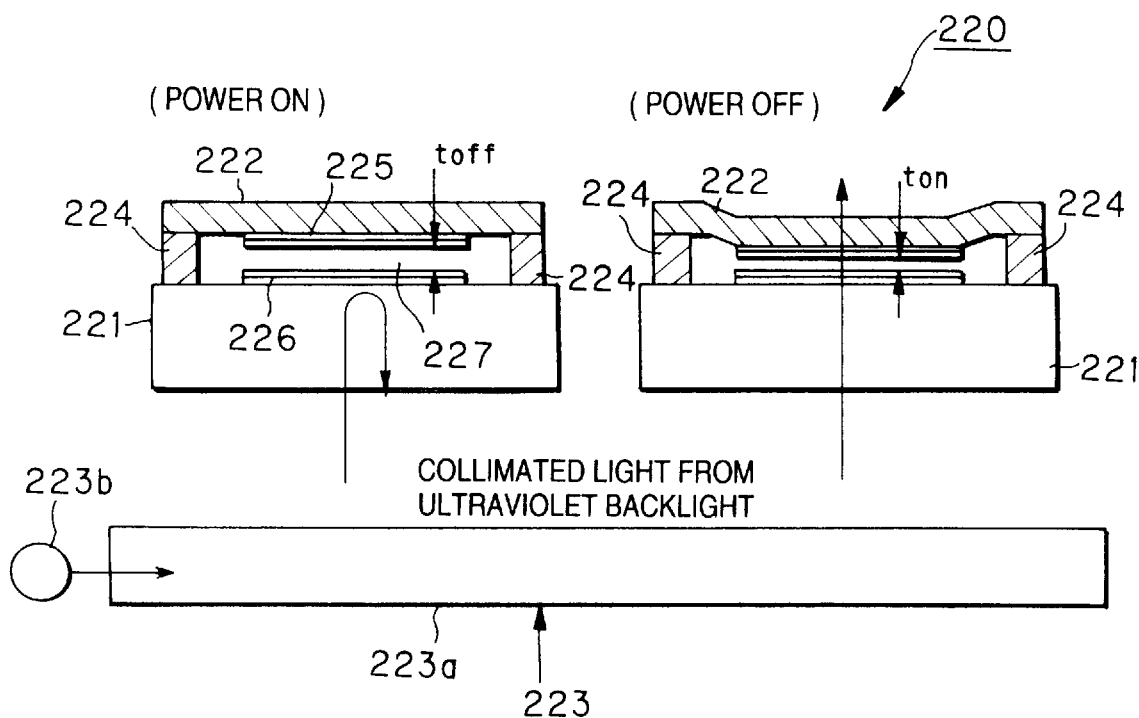
FIG. 22 is a schematic representation of the operation of light modulation elements using a multiplayer film interference effect according to another embodiment of the invention.

FIG. 22 is a schematically sectional view of light modulation elements and a surface light source according to another embodiment of the invention. A light modulation element 220 displaces a diaphragm 222 by applying voltage to an on-substrate electrode (not shown) placed on a substrate 221 transparent for ultraviolet rays and an on-diaphragm electrode (not shown) placed on a diaphragm 222 and produces a multilayer film interference effect, thereby executing light modulation of ultraviolet rays from a surface light source 223.

The surface light source 223 consists of a surface light source unit 223*a* like a flat plate and a blacklight ultraviolet lamp (low-pressure mercury lamp) 223*b* provided on the side of the surface light source unit 223*a*. The surface light source 223 allows ultraviolet rays from the blacklight low-pressure mercury lamp 223*b* to be incident on the side of the surface light source unit 223*a* and emits the ultraviolet rays from the top.

Figure 23:
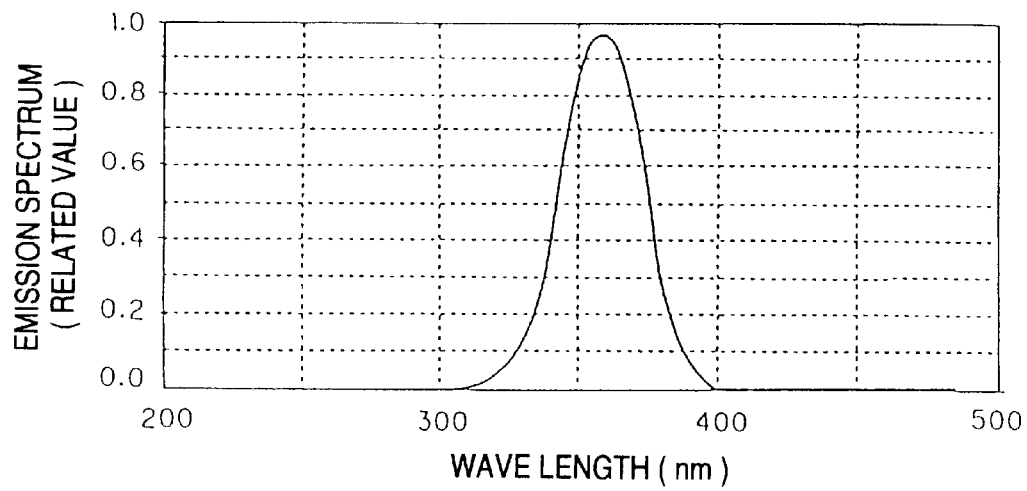
FIG. 23 is a drawing to show the spectral characteristic of backlight with a low-pressure mercury lamp shown in FIG. 22.

If blacklight fluorescent material (for example, $BaSio_2O_5:Pb^{2+}$) is applied to the inner wall of the blacklight low-pressure mercury lamp 223*b*, central wavelength λ0 is provided in the vicinity of 360 nm, as shown in FIG. 23, as the spectral characteristic of light emission ultraviolet rays. The ultraviolet rays are used as backlight light.

A pair of on-substrate electrodes (not shown) is placed on the substrate with a predetermined spacing in a direction perpendicular to the plane of FIG. 22. Dielectric multilayer film mirrors 225 and 226 are placed between the on-substrate electrodes on the substrate 221.

The diaphragm 222 is placed on a support 224 with both end parts formed on the substrate 221 and faces the substrate 221 with a predetermined gap between. On the lower face of the diaphragm 222, the dielectric multilayer film mirror 225 is placed facing the dielectric multilayer film mirror 226 on the substrate 221 with a predetermined gap t between.

In the described light modulation element 220, the gap of a cavity 227 when the applied voltage to each electrode is off is toff (the state of the left light modulation element in FIG. 22). When voltage is applied, the gap of the cavity 227 is shortened by an electrostatic force and this gap is ton (the state of the right light modulation element in FIG. 22). The gap ton is appropriately set by balancing the electrostatic force acting on the diaphragm 222 as voltage is applied to each electrode and a restoration force produced as the diaphragm 222 becomes deformed.

To perform stabler control, a spacer (not shown) is provided on electrode and displacement of the diaphragm 222 is physically regulated by means of the spacer so that the displacement amount of the diaphragm 222 becomes constant. If the spacer is made of an insulator, the effect of decreasing the applied voltage to each electrode is produced because of the relative dielectric constant of the spacer (1 or more). If the spacer is electrically conductive, the effect furthermore grows. The spacer and the electrodes may be formed of the same material.

Here, ton and toff are set as follows:

(m=1)

ton=1/2×$\lambda_0$=180 nm ($\lambda_0$: Central wavelength of ultraviolet rays)

toff=3/4×$\lambda_0$=270 nm

Figure 24:
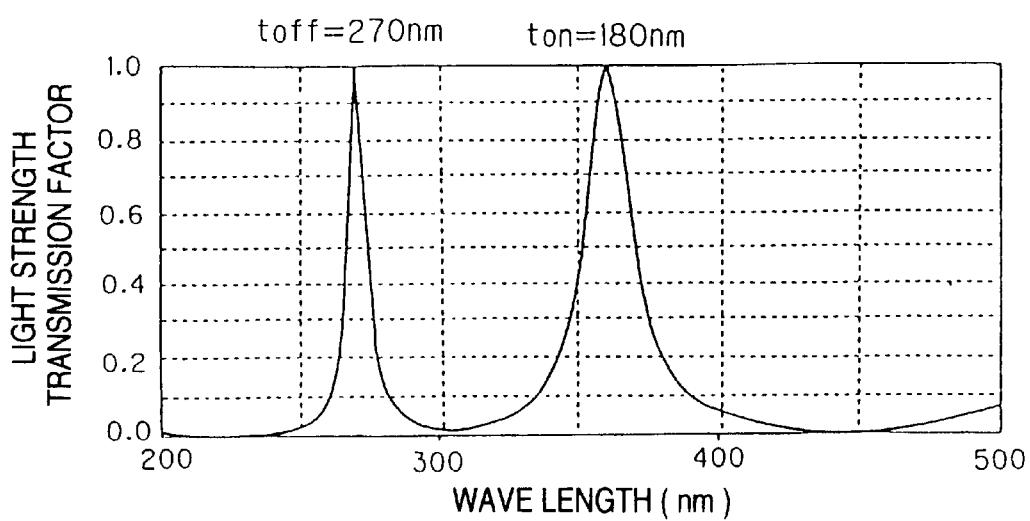
FIG. 24 is a drawing to show the light strength transmission factor of light modulation element when the backlight having the characteristic shown in FIG. 23 is used.

For each of the dielectric multilayer film mirrors 225 and 226, light strength reflection factor R is set to 0.85. The cavity 227 is filled with air or rare gas and its refractive index is set as n=1. Since the ultraviolet rays are collimated, the incidence angle of light incident on the light modulation element 220, i, (the angle between the normal to the dielectric multilayer film mirror surface and the incident ray) is roughly zero. The light strength transmission factor of the light modulation element 220 at this time becomes as shown in FIG. 24.

Therefore, when no voltage is applied to each electrode, toff=270 nm, and the light modulation element 220 scarcely allows ultraviolet rays to pass through.

On the other hand, if voltage is applied to each electrode and ton is set to 180 nm, the light modulation element 220 allows ultraviolet rays to pass through.

If the interference condition is satisfied, the gap t of the cavity 227, the refractive index n, the light strength reflection factor R of each dielectric multilayer film mirror 225, 226, and the like may be combined as desired.

If the gap t is changed continuously according to the voltage value, the central wavelength of transmission spectrum can be changed as desired, whereby the transmission light amount can also be controlled continuously. This means that gradation control is enabled by changing the applied voltage across the electrodes.

As a modified example of the light modulation element 220, backlight with a low-pressure mercury lamp can also be used in place of the blacklight mercury lamp 223*b*.

Figure 25:
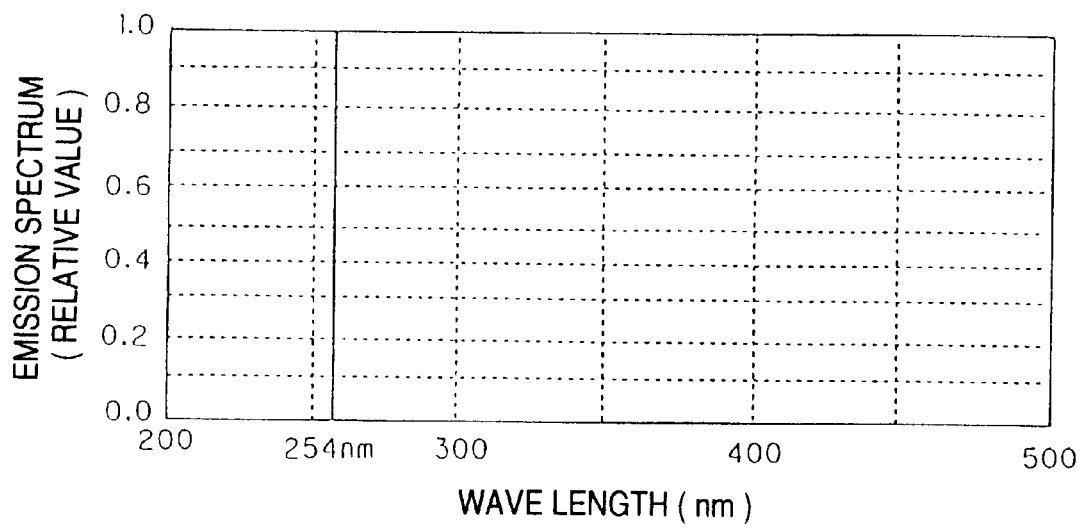
FIG. 25 is a drawing to show characteristic when ultraviolet backlight is used as the backlight shown in FIG. 22.

That is, a low-pressure mercury lamp comprising a 254-nm line spectrum as the main component is used as a light source and is combined with a transparent substrate made of silica glass, etc., for forming a backlight unit. Other wavelengths are cut through a filter, etc. The spectral characteristic of the ultraviolet backlight at this time becomes as shown in FIG. 25.

In the light modulation element, materials for allowing 254-nm ultraviolet rays to pass through are used as the component materials of the effective pixel areas (diaphragm, dielectric multilayer film mirrors, substrate, etc.,).

Here, ton and toff are set as follows:

(m=1)

ton=$1/2 \times \lambda_0$=127 nm ($\lambda_0$: Central wavelength of ultraviolet rays)

toff=$3/4 \times \lambda_0$=191 nm

Figure 26:
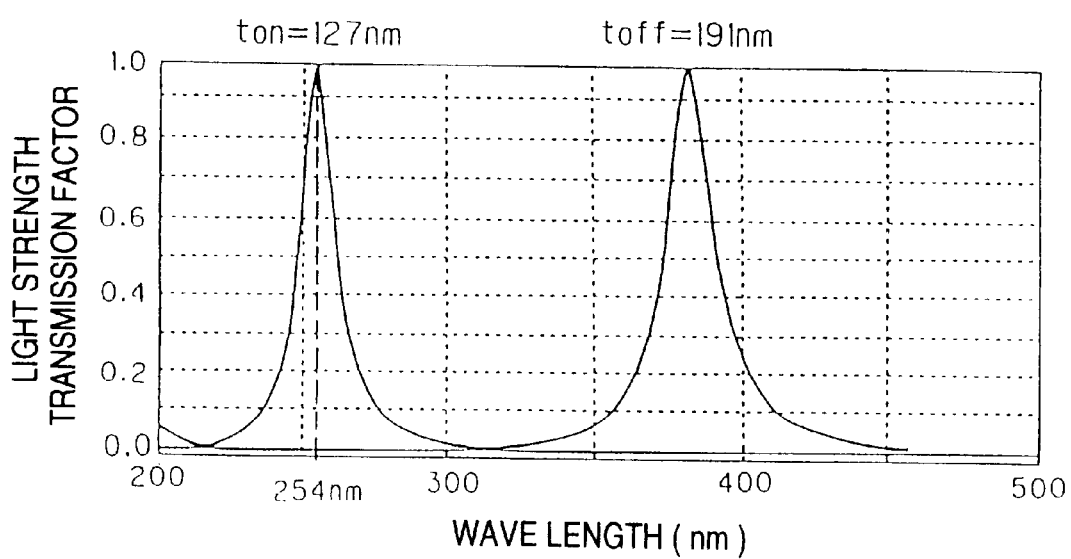
FIG. 26 is a drawing to show the light strength transmission factor of the light modulation element shown in FIG. 25.

Other conditions are set to R=0.85, n=1, and I=0 as in the example described above. The light strength transmission factor of the light modulation element at this time becomes as shown in FIG. 26.

Therefore, when no voltage is applied to each electrode, toff=191 nm, and the light modulation element scarcely allows ultraviolet rays to pass through; when voltage is applied to each electrode, ton=127 nm, and the light modulation element allows ultraviolet rays to pass through.

Particularly in the modified example, the ultraviolet rays are a line spectrum, a very high energy transmission factor is shown and highly efficient modulation high in contrast is enabled.

Also in the modified example, if the interference condition is satisfied, the gap t of the cavity 227, the refractive index n, the light strength reflection factor R of each dielectric multilayer film mirror 225, 226, and the like may be combined as desired.

Further, if the gap t is changed continuously by changing the voltage applied to each electrode, the central wavelength of transmission spectrum can be changed as desired, whereby the transmission light amount can also be controlled continuously. This means that gradation control is enabled by changing the applied voltage to each electrode.

Next, another modified example of the light modulation element will be discussed with reference to FIG. 27.

Figure 27:
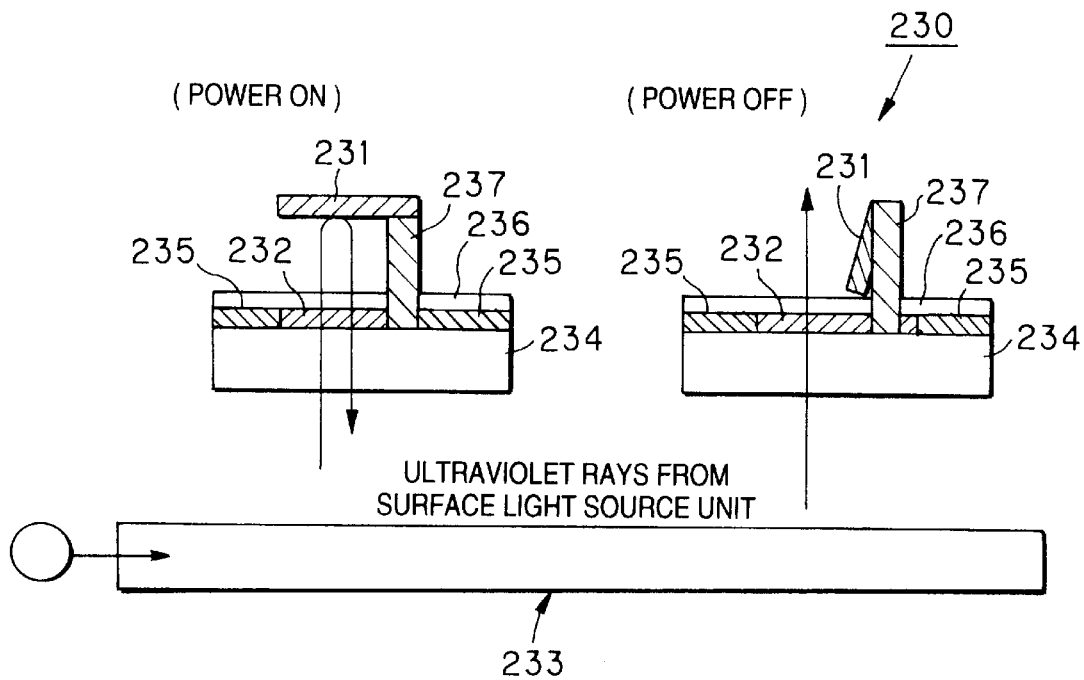
FIG. 27 is a schematic diagram of light modulation elements of deformation type and a surface light source according to another embodiment of the invention.

FIG. 27 is a schematically sectional view of light modulation elements of deformation type and a surface light source according to another embodiment of the invention. A light modulation element 230 deforms a shield plate 231 by an electrostatic force produced by applying voltage to the shield plate 231 and a transparent electrode 232 and changes the path of ultraviolet rays from a surface light module 233, thereby executing light modulation. The configuration of the surface light source 233 is similar to that of the surface light source 223 shown in FIG. 22.

The transparent electrode 232 is placed on a substrate 234 allowing ultraviolet rays to pass through and passes through ultraviolet rays. An insulation shield film 235 is placed on portions other than the transparent electrode 232 on the substrate 234. An insulating film 236 is deposited on the tops of the transparent electrode 232 and the shield film 235.

The shield plate 231 is provided as a cantilever structure facing the substrate 234 with a predetermined spacing above the substrate 234 via a support 237 upright on the substrate 234. The shape of the shield plate 231 corresponds to the shape of the transparent electrode 232 on the substrate 234 opposed to the shield plate 231; the shield plate 231 is formed slightly larger than the transparent electrode 232.

The shield plate 231 is made of a flexible thin film having electric conductivity; for example, it is formed of a single conductive thin film made of a material for absorbing or reflecting ultraviolet rays or a plurality of conductive thin films.

Specifically, a single structure made of a metal thin film of aluminum, chromium, etc., reflecting ultraviolet rays or a semiconductor of polysilicon, etc., absorbing ultraviolet rays is possible. A structure comprising metal evaporated on an insulating film of a silicon oxide, silicon nitride, etc., a semiconductor thin film of polysilicon, etc., or a composite structure wherein a filter of a dielectric multilayer film, etc., is deposited can also be adopted.

The described light modulation element 230 operates as follows: In the light modulation element 230, in a state in which no voltage is applied across the shield plate 231 and the transparent electrode 232, the shield plate 231 is opposed to the transparent electrode 232 and ultraviolet rays passing through the transparent electrode 232 are absorbed or reflected on the shield plate 231 (left light modulation element in FIG. 27).

On the other hand, a voltage is applied across the shield plate 231 and the transparent electrode 232, the shield plate 231 becomes deformed to the side of the transparent electrode 232 while it is twisted by an electrostatic force acting on the shield plate 231 and the transparent electrode 232 (right light modulation element in FIG. 27), whereby the ultraviolet rays passing through the transparent electrode 232 from the surface light source 233 are emitted upward without being shielded by the shield plate 231.

If the applied voltage across the shield plate 231 and the transparent electrode 232 is again set to zero, the shield plate 231 is restored to the initial position because of elasticity of the shield plate 231 itself and the support 237.

Next, another modified example of the light modulation element will be discussed with reference to FIGS. 28 and 29.

Figure 28A:
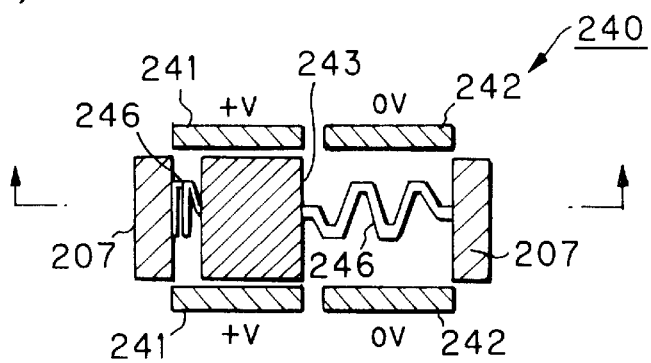
FIGS. 28A and 28B are schematic representations of a light modulation element of move type according to another embodiment of the invention.
Figure 28B:
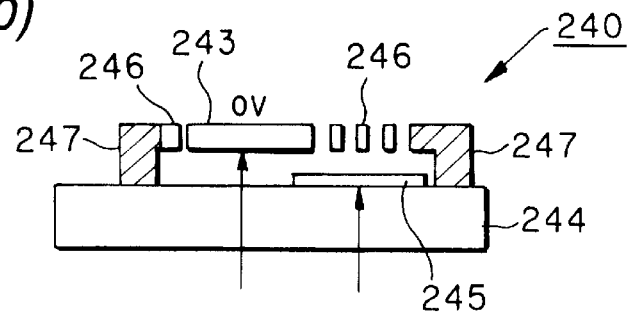

FIGS. 28A and 28B are schematic diagrams of a light modulation element of move type according to another embodiment of the invention; FIG. 28A is a plan view and FIG. 28B is a sectional view taken on line B—B in FIG. 28A.

A light modulation element 240 displaces an electrode shield plate 243 from side to side in FIG. 28 by an electrostatic force produced by applying voltage to counter electrodes 241, 242 and the electrode shield plate 243, thereby shielding light from a surface light source (not shown) or allowing the light to pass through.

The counter electrodes 241, 242 are opposed in a pair with a predetermined spacing on a substrate 244 allowing ultraviolet rays to pass through (in FIG. 28A, two pairs are provided in total in parallel). A shield film 245 is placed between the right counter electrodes 242 in FIG. 28 on the substrate 244.

The electrode shield plate 243 is placed displaceably from side to side at a position with a predetermined spacing from the substrate 244 to the top of FIG. 28B between the counter electrodes 241, 242. That is, the electrode shield plate 243 is supported at both the left and right on supports 207 via flexible members such as polygonal line springs 246. The electrode shield plate 243 is displaced from side to side in FIG. 28 while the polygonal line springs 246 are elastically deformed 28 by an electrostatic force produced by applying voltage to the counter electrodes 241, 242. The side-to-side (left-to-right) dimension of the electrode shield plate 243 is roughly a half the distance along the side-to-side (left-to-right) space between the supports 247.

The described light modulation element 240 operates as follows: In the light modulation element 240, if voltage is applied only to the left counter electrodes 241 in FIG. 28 with voltage zero applied to the electrode shield plate 243, the electrode shield plate 243 is moved to the space between the left counter electrodes 241 in FIG. 28 by an electrostatic force (state shown in FIG. 28), whereby light emitted from the surface light source and passing through the substrate 244 without being shielded by the shield film 245 is shielded by the electrode shield plate 243.

Figure 29A:
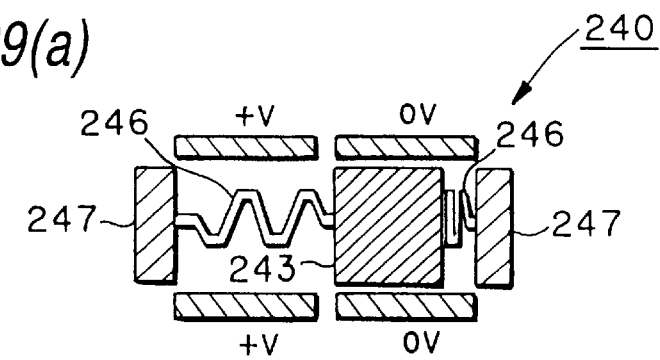
FIGS. 29A and 29B are drawings to describe the light guide state of the light modulation element shown in FIGS. 28A and 28B.
Figure 29B:
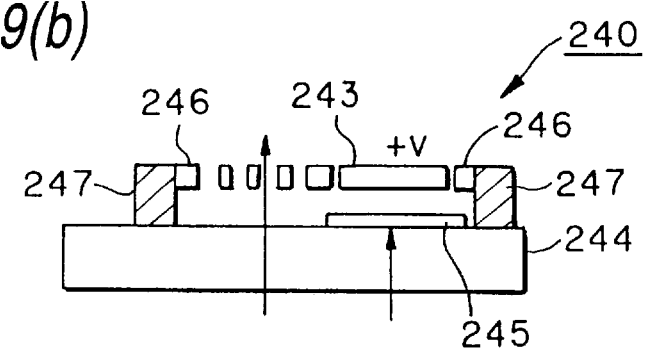
Figure 30:
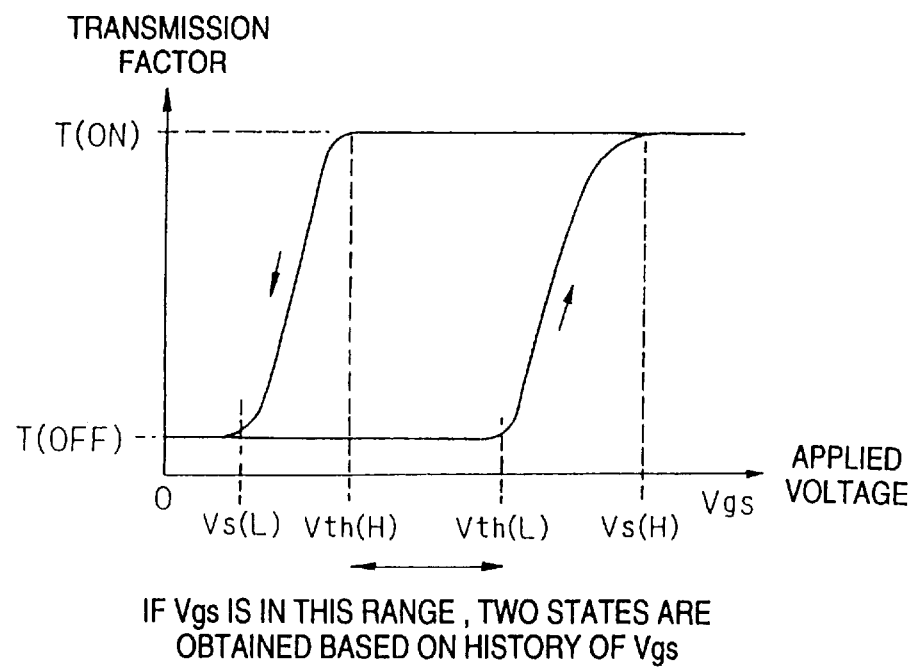
FIG. 30 is a drawing to show the hysteresis characteristic of a light modulation element in a related art.

On the other hand, if voltage is applied only to the left counter electrodes 241 in FIG. 29 with voltage of +V applied to the electrode shield plate 243, the electrode shield plate 243 is moved to the space between the right counter electrodes 242 in FIG. 29 by an electrostatic force (state shown in FIG. 29), whereby light emitted from the surface light source and passing through the substrate 244 without being shielded by the shield film 245 is not shielded either by the electrode shield plate 243 and is emitted to the top of FIG. 29B.

If the applied voltage is again set to zero, the electrode shield plate 243 is restored to the initial position by the elastic force of the polygonal line spring 246 and electrostatic force.

Thus, various configurations of the light modulation elements can be applied; in addition, any configuration may be adopted if an equivalent function is provided.

What is claimed is:

1. An array-type light modulation element drive method comprising steps of: arranging a plurality of electromechanical light modulation elements for executing light modulation by displacement operation of respective flexible sections of the light modulation elements by an electrostatic force and elastic restoration operation of the flexible sections, selecting a pixel associated with one of the plurality of the electromechanical light modulation elements, giving a data signal to an electrode of the selected pixel for driving the selected pixel, and providing an AC signal to an electrode of said one of the plurality of electromechanical light modulation elements for executing AC drive of said one light modulation element.

2. The array-type light modulation element drive method as claimed in claim 1 wherein the AC drive of the light modulation element is provided by dividing a basic period of a scan drive signal into an odd frame and an even frame and a polarity of the scan drive signal is inverted in the odd and even frames.

3. The array-type light modulation element drive method as claimed in claim 2 wherein the AC drive of the light modulation element is AC drive in an active matrix structure of pixels.

4. The array-type light modulation element drive method as claimed in claim 3 wherein the active matrix structure is any of a mechanical conductive switch type active matrix structure, a mechanical switch type active matrix structure, or a semiconductor switch type active matrix structure.

5. The array-type light modulation element drive method as claimed in claim 1 wherein the AC drive of the light modulation element is AC drive in a simple matrix structure of pixels.

6. The array-type light modulation element drive method as claimed in claim 5 wherein the AC drive of the simple matrix structure is to set voltage across electrodes in an even frame, Veven, to the difference between applied voltage maximum value Vmax and voltage across electrodes in an odd frame, Vodd.

7. A drive method of a flat-panel display comprising an array-type light modulation element, a surface light source placed facing the array-type light modulation element, and a phosphor disposed on the opposite side to the surface light source with the array-type light modulation element between, said method comprising the steps of driving the array-type light modulation element by a drive method as claimed in any one of claims 1 to 6 and causing the phosphor to emit light for producing display by light emitted from the array-type light modulation element.

8. The flat-panel display drive method as claimed in claim 7 wherein the surface light source is a light source for emitting ultraviolet rays for exciting the phosphor.

9. The array-type light modulation element drive method as claimed in claim 1 wherein the AC drive of the light modulation element is AC drive in an active matrix structure of pixels and wherein the active matrix structure is any of a mechanical conductive switch type active matrix structure, a mechanical switch type active matrix structure, or a semiconductor switch type active matrix structure.

10. A drive method of a flat-panel display comprising an array-type light modulation element, a surface light source placed facing the array-type light modulation element, and a phosphor disposed on an opposite side to the surface light source with the array-type light modulation element between, said method comprising the steps of driving the array-type light modulation element by a drive method as claimed in claim 9 and causing the phosphor to emit light for producing display by light emitted from the array-type light modulation element.

11. The flat-panel display drive method as claimed in claim 10 wherein the surface light source is a light source for emitting ultraviolet rays for exciting the phosphor.

12. An array-type light modulation element drive method comprising steps of: arranging a plurality of electromechanical light modulation elements in a two-dimensional matrix for executing light modulation by displacement operation of respective flexible sections of the electromechanical light modulation elements, providing a scan electrode signal to select a pixel associated with one of the plurality of the electromechanical light modulation elements, and giving an AC data signal to an electrode of the selected pixel for driving the selected pixel using AC drive.

* * * * *